United States Patent
Ozturk et al.

(10) Patent No.: US 11,659,379 B2
(45) Date of Patent: May 23, 2023

(54) DYNAMIC CAPACITY FOR MULTIPLE UNIVERSAL SUBSCRIBER IDENTITY MODULES

(71) Applicant: QUALCOMM Incorporated, San Diego, CA (US)

(72) Inventors: Ozcan Ozturk, San Diego, CA (US); Gavin Bernard Horn, La Jolla, CA (US); Punyaslok Purkayastha, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/158,245

(22) Filed: Jan. 26, 2021

(65) Prior Publication Data
US 2022/0109976 A1    Apr. 7, 2022

Related U.S. Application Data

(60) Provisional application No. 63/087,138, filed on Oct. 2, 2020.

(51) Int. Cl.
| | |
|---|---|
| *H04W 8/24* | (2009.01) |
| *H04L 5/00* | (2006.01) |
| *H04W 8/18* | (2009.01) |
| *H04W 76/27* | (2018.01) |
| *H04W 80/02* | (2009.01) |

(52) U.S. Cl.
CPC .............. *H04W 8/24* (2013.01); *H04L 5/0053* (2013.01); *H04W 8/183* (2013.01); *H04W 76/27* (2018.02); *H04W 80/02* (2013.01)

(58) Field of Classification Search
CPC ....... H04W 8/24; H04W 8/183; H04W 76/27; H04W 80/02; H04W 60/005; H04L 5/0053
See application file for complete search history.

(56) References Cited

U.S. PATENT DOCUMENTS

2020/0374833 A1\* 11/2020 Guo ...................... H04W 88/06
2021/0329444 A1\* 10/2021 Wiemann ................ H04W 8/24

FOREIGN PATENT DOCUMENTS

WO    2020067987 A1    4/2020

OTHER PUBLICATIONS

33rd Generation Partnership Project; Technical Specification Group Services and System Aspects; Study on system enablers for devices having multiple Universal Subscriber Identity Modules (USIM) (Release 17); TR 23.761 V.1.0.0. (Year: 2020).\*

(Continued)

*Primary Examiner* — Shailendra Kumar
(74) *Attorney, Agent, or Firm* — Procopio, Cory, Hargreaves & Savitch LLP

(57) ABSTRACT

A configuration for dynamic capacity for multiple universal subscriber identity modules. The apparatus transmits, to a base station, UE capability information in response to a UE capability enquiry, the UE capability information including a set of UE capabilities. The apparatus transmits, to the base station, UAI including an IE indicating a modified subset of UE capabilities of the set of UE capabilities when multiple USIMs are active at the UE. The apparatus operates based on the modified subset of UE capabilities when multiple USIMs are active at the UE.

30 Claims, 18 Drawing Sheets

(56) References Cited

OTHER PUBLICATIONS

3rd Generation Partnership Project; Technical Specification Group Radio Access Network; Evolved Universal Terrestrial Radio Access (E-UTRA); Radio Resource Control (RRC); TS 36.331 V.16.1.1 . (Year: 2020).*

3GPP TS 36.331: "3rd Generation Partnership Project; Technical Specification Group Radio Access Network; Evolved Universal Terrestrial Radio Access (E-UTRA); Radio Resource Control (RRC); Protocol Specification (Release 16)", vol. RAN WG2. No. V16.1.1, Jul. 26, 2020, pp. 1-1078, XP051925852, Retrieved from Internet: URL: https://ftp.3gpp.org/Specs/archive/36_series/36.331/36331-g11.zip, 36331-g11.docx [retrieved Jul. 26, 2020] Section 5.6.19 and p. 380, p. 258, paragraph 5.6.3 UE capability transfer p. 277, paragraph 5.6.10.3, figures 5.6.10.1-1.

3GPP TS 38.331: "3rd Generation Partnership Project; Technical Specification Group Radio Access Network; NR; Radio Resource Control (RRC) Protocol Specification (Release 16)", 3GPP Standard, Technical Specification, 3GPP TS 38.331, 3GPP, vol. RAN WG2, No. V16.1.0, Jul. 24, 2020, pp. 1-910, XP051925836, Retrieved from Internet: URL: https://ftp.3gpp.org/Specs/archive/38_series/38.331/38331-g10.zip, 38331-g10.docx [retrieved Jul. 24, 2020] p. 168, paragraph 5.6; p. 192, paragraph 5.74.3a, figures 5.6.1.1-1, 5.7.4.1-1.

"3rd Generation Partnership Project, Technical Specification Group Services and System Aspects, Study on system enablers for devices having multiple Universal Subscriber Identity Modules (USIM) (Release 17)", 3GPP Draft, SP-200693.ZIP 23761-100, 3GPP TR 23.761 V1.0.0 (Nov. 2020), 3GPP, Sep. 8, 2020, 103 Pages, XP051932719, Retrieved from Internet: URL: https://www.3gpp.org/ftp/tsg_sa/TSG_SA/TSGs_89E_Electronic/Docs/SP-200693.zip, 23761-100.zip 23761-100.docx [retrieved Sep. 8, 2020] p. 26, paragraph 6.5; p. 82, paragraph 6.23.3.1, figs 6.23.3.1-1.

"3rd Generation Partnership Project, Technical Specification Group Services and System Aspects, System Architecture for the 5G System (5GS), Stage 2 (Release 16)", 3GPP Draft, 23501-G6 0_CRS Implemented Not CR2448R1, 3GPP, Sep. 21, 2020, 438 Pages, XP051935302, Retrieved from Internet: URL: https://ftp.3gpp.org/tsg_sa/WG2_Arch/Latest_SA2_Specs/DRAFT_INTERIM/23501-g60_CRs_Implemented_Not_CR2448R1.zip, 23501-g60_CRs_Implemented_Not_CR2448RI.docx, [retrieved Sep. 21, 2020] p. 78, paragraph 5.3.3; p. 97, paragraph 5.4.4a.

"3rd Generation Partnership Project; Technical Specification Group Services and System Aspects; System Architecture for the 5G System; Stage 2 (Release 15)", 3GPP Standard; Technical Specification; 3GPP TS 23.501, 3rd Generation Partnership Project (3GPP), Mobile Competence Centre; 650, Route Des Lucioles; F-06921—Sophia-Antipolis Cedex; France, vol. SA WG2, No. V15.3.0, Sep. 17, 2018, XP051487016, [retrieved on Sep. 17, 2018], section 5.7.6.3; pp. 1-226.

International Search Report and Written Opinion—PCT/US2021/048736—ISA/EPO—dated Jan. 4, 2022.

* cited by examiner

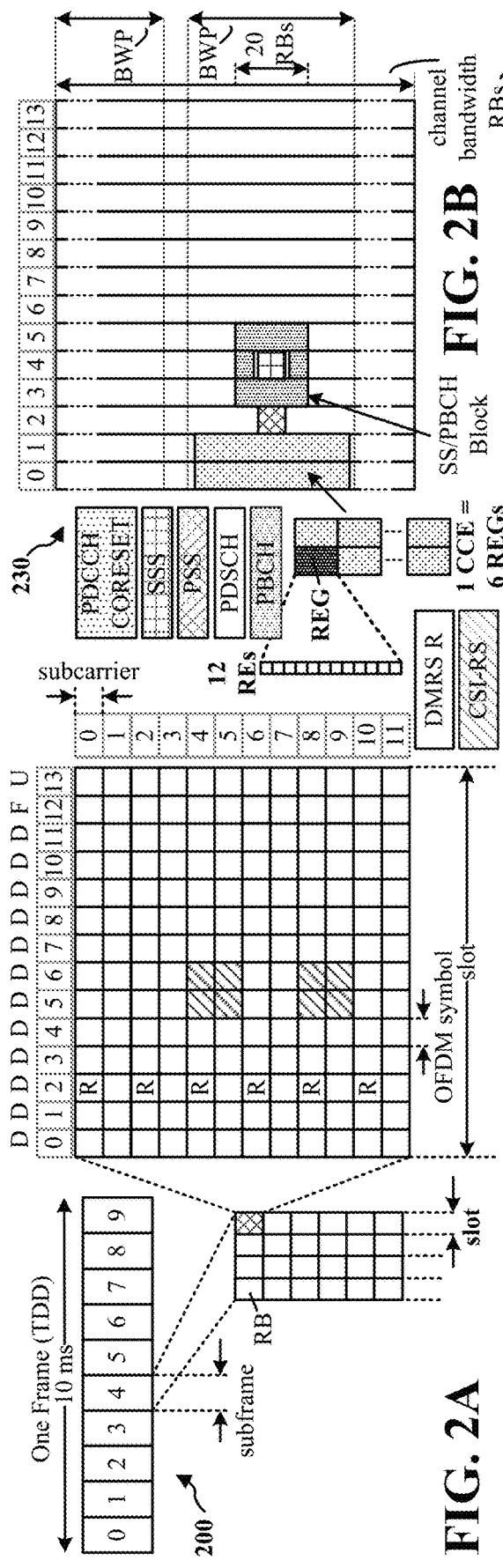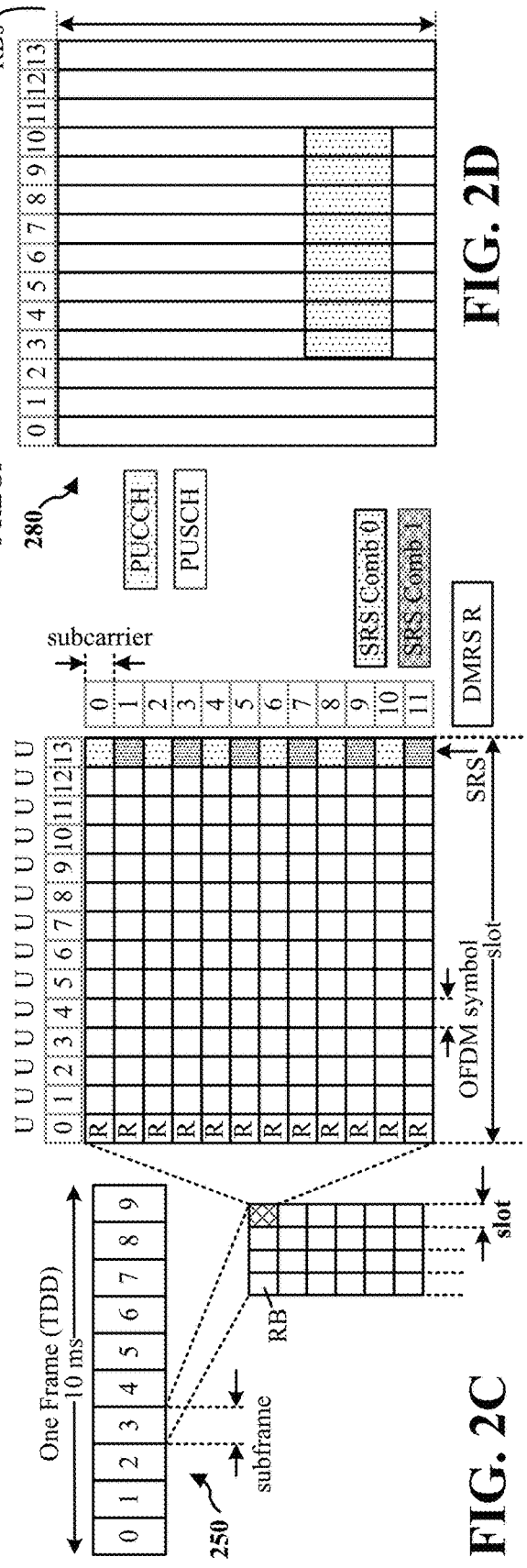
FIG. 2A  FIG. 2B  FIG. 2C  FIG. 2D

DYNAMIC CAPACITY FOR MULTIPLE UNIVERSAL SUBSCRIBER IDENTITY MODULES

CROSS REFERENCE TO RELATED APPLICATION(S)

This application claims the benefit of U.S. Provisional Application Ser. No. 63/087,138, entitled "Dynamic Capacity for Multiple Universal Subscriber Identity Modules" and filed on Oct. 2, 2020, which is expressly incorporated by reference herein in its entirety.

BACKGROUND

Technical Field

The present disclosure relates generally to communication systems, and more particularly, to a configuration for dynamic capacity for multiple universal subscriber identity modules.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus transmits, to a base station, UE capability information in response to a UE capability enquiry, the UE capability information including a set of UE capabilities. The apparatus transmits, to the base station, UE assistance information (UAI) including an information element (IE) indicating a modified subset of UE capabilities of the set of UE capabilities when multiple universal subscriber identity modules (USIMs) are active at the UE. The apparatus operates based on the modified subset of UE capabilities when multiple USIMs are active at the UE.

In an aspect of the disclosure, a method, a computer-readable medium, and an apparatus are provided. The apparatus may be a device at a UE. The device may be a processor and/or a modem at a UE or the UE itself. The apparatus transmits, to a base station, UE capability information in response to a UE capability enquiry, the UE capability information including a set of UE capabilities. The apparatus transmits a capability change information element (IE) indicating a subset of UE capabilities of the set of UE capabilities to change.

In an aspect of the disclosure, a method, a computer-readable medium, and an apparatus are provided. The apparatus may be a device at a UE. The device may be a processor and/or a modem at a UE or the UE itself. The apparatus transmits, to a base station, UE capability information in response to a UE capability enquiry, the UE capability information including a set of UE capabilities. The apparatus transmits a set of profiles, each profile of the set of profiles indicating a modified subset of UE capabilities of the set of UE capabilities. The apparatus determines a change at the UE. The apparatus transmits, based on the determined change at the UE, information to the base station indicating a change to a first profile of the set of profiles in response to the determined change at the UE.

In an aspect of the disclosure, a method, a computer-readable medium, and an apparatus are provided. The apparatus may be a device at a UE. The device may be a processor and/or a modem at a UE or the UE itself. The apparatus transmits, to a base station, first UE capability information in response to a UE capability enquiry, the first UE capability information including a first set of UE capabilities. The apparatus determines a change at the UE. The apparatus transmits, to the base station, an indication to indicate the change at the UE to initiate a UE capability enquiry process. The apparatus transmits, to the base station, second UE capability information in association with the determined change at the UE, the second UE capability information including a second set of UE capabilities.

In an aspect of the disclosure, a method, a computer-readable medium, and an apparatus are provided. The apparatus may be a device at a base station. The device may be a processor and/or a modem at a base station or the base station itself. The apparatus transmits, to a user equipment (UE), a UE capability enquiry. The apparatus receives, from the UE, UE capability information in response to the UE capability enquiry, the UE capability information including a set of UE capabilities. The apparatus receives, from the UE, UE assistance information (UAI) including an information element (IE) indicating a modified subset of UE capabilities of the set of UE capabilities when multiple universal subscriber identity modules (USIMs) are active at the UE. The apparatus communicates with the UE based on the modified subset of UE capabilities when multiple USIMs are active at the UE.

In an aspect of the disclosure, a method, a computer-readable medium, and an apparatus are provided. The apparatus may be a device at a base station. The device may be a processor and/or a modem at a base station or the base station itself. The apparatus transmits, to a user equipment (UE), a UE capability enquiry. The apparatus receives, from the UE, UE capability information in response to the UE capability enquiry, the UE capability information including a set of UE capabilities. The apparatus receives, from the UE, a capability change information element (IE) indicating a subset of UE capabilities of the set of UE capabilities to change.

In an aspect of the disclosure, a method, a computer-readable medium, and an apparatus are provided. The apparatus may be a device at a base station. The device may be a processor and/or a modem at a base station or the base station itself. The apparatus transmitting, to a user equipment (UE), a UE capability enquiry. The apparatus receives, from the UE, UE capability information in response to the UE capability enquiry, the UE capability information including a set of UE capabilities. The apparatus receives a set of profiles, each profile of the set of profiles indicating a modified subset of UE capabilities of the set of UE capabilities. The apparatus receives, based on the determined change at the UE, information indicating a change to a first profile of the set of profiles in response to a determined change at the UE.

In an aspect of the disclosure, a method, a computer-readable medium, and an apparatus are provided. The apparatus may be a device at a base station. The device may be a processor and/or a modem at a base station or the base station itself. The apparatus transmits, to a user equipment (UE), a UE capability enquiry. The apparatus receives, from the UE, first UE capability information in response to the UE capability enquiry, the first UE capability information including a first set of UE capabilities. The apparatus receives, from the UE, an indication to indicate at least one change at the UE to initiate a UE capability enquiry process. The apparatus receives, from the UE, second UE capability information in association with the change at the UE, the second UE capability information including a second set of UE capabilities.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
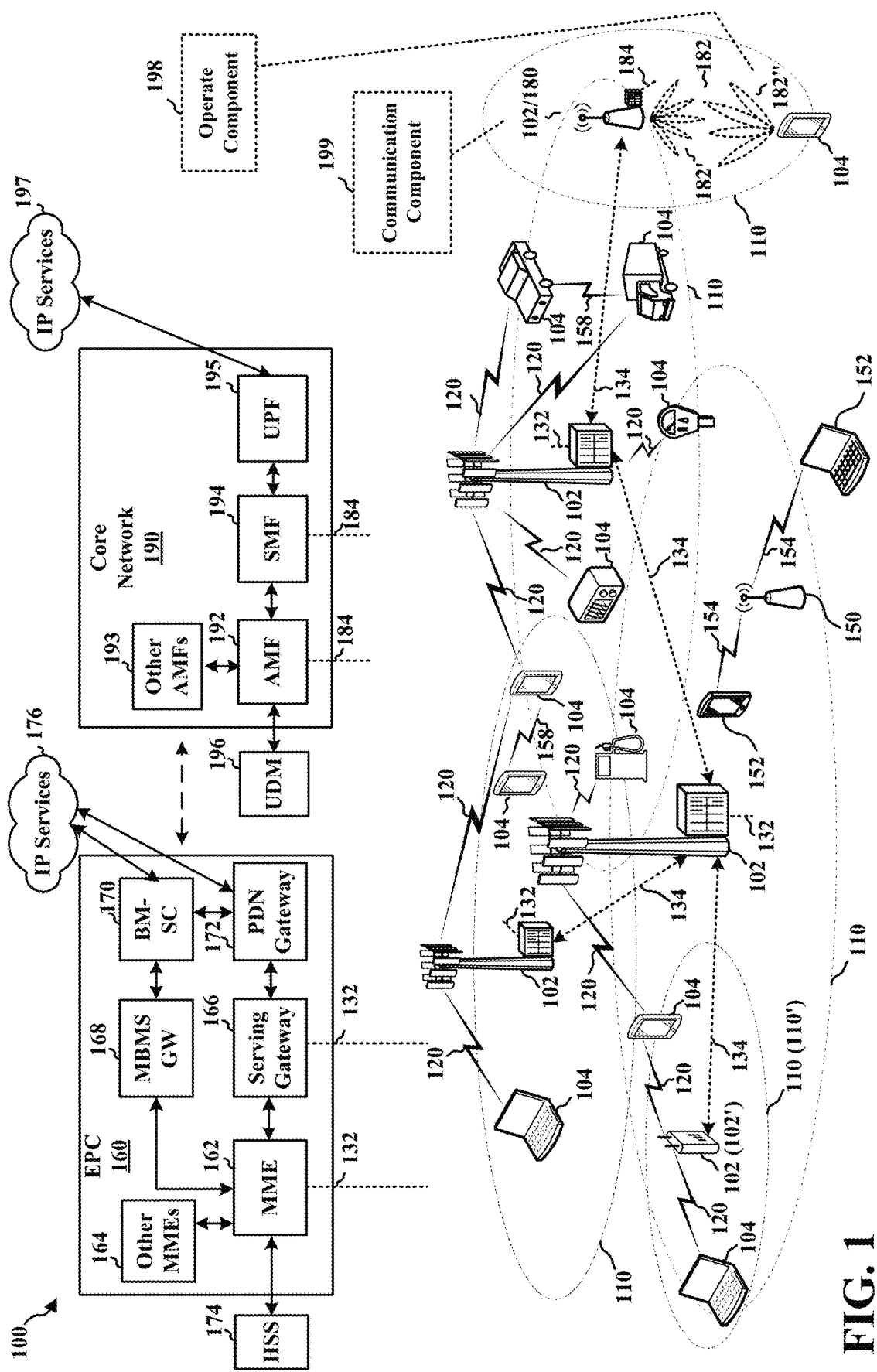
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to operate based on a modified subset of UE capabilities when multiple USIMs are active at the UE 104. For example, the UE 104 may comprise an operate component 198 configured to operate based on the modified subset of UE capabilities when multiple USIMs are active at the UE 104. The UE 104 transmits, to a base station 180, UE capability information in response to a UE capability enquiry, the UE capability information including a set of UE capabilities. The UE 104 transmits, to the base station 180, UE assistance information (UAI) including an information element (IE) indicating a modified subset of UE capabilities of the set of UE capabilities when multiple universal subscriber identity modules (USIMs) are active at the UE. The UE 104 operates based on the modified subset of UE capabilities when multiple USIMs are active at the UE 104.

Referring again to FIG. 1, in certain aspects, the base station 180 may be configured to communicate with a UE 104 based on a modified subset of UE capabilities when multiple USIMs are active at the UE 104. For example, the base station 180 may comprise a communication component 199 configured to communicate with the UE 104 based on the modified subset of UE capabilities when multiple USIMs are active at the UE 104. The base station 180 transmits, to the UE 104, a UE capability enquiry. The base station 180 receives, from the UE 104, UE capability information in response to the UE capability enquiry, the UE capability information including a set of UE capabilities. The base station 180 receives, from the UE 104, UAI including an IE indicating a modified subset of UE capabilities of the set of UE capabilities when multiple USIMs are active at the UE. The base station 180 communicates with the UE 104 based on the modified subset of UE capabilities when multiple USIMs are active at the UE 104.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
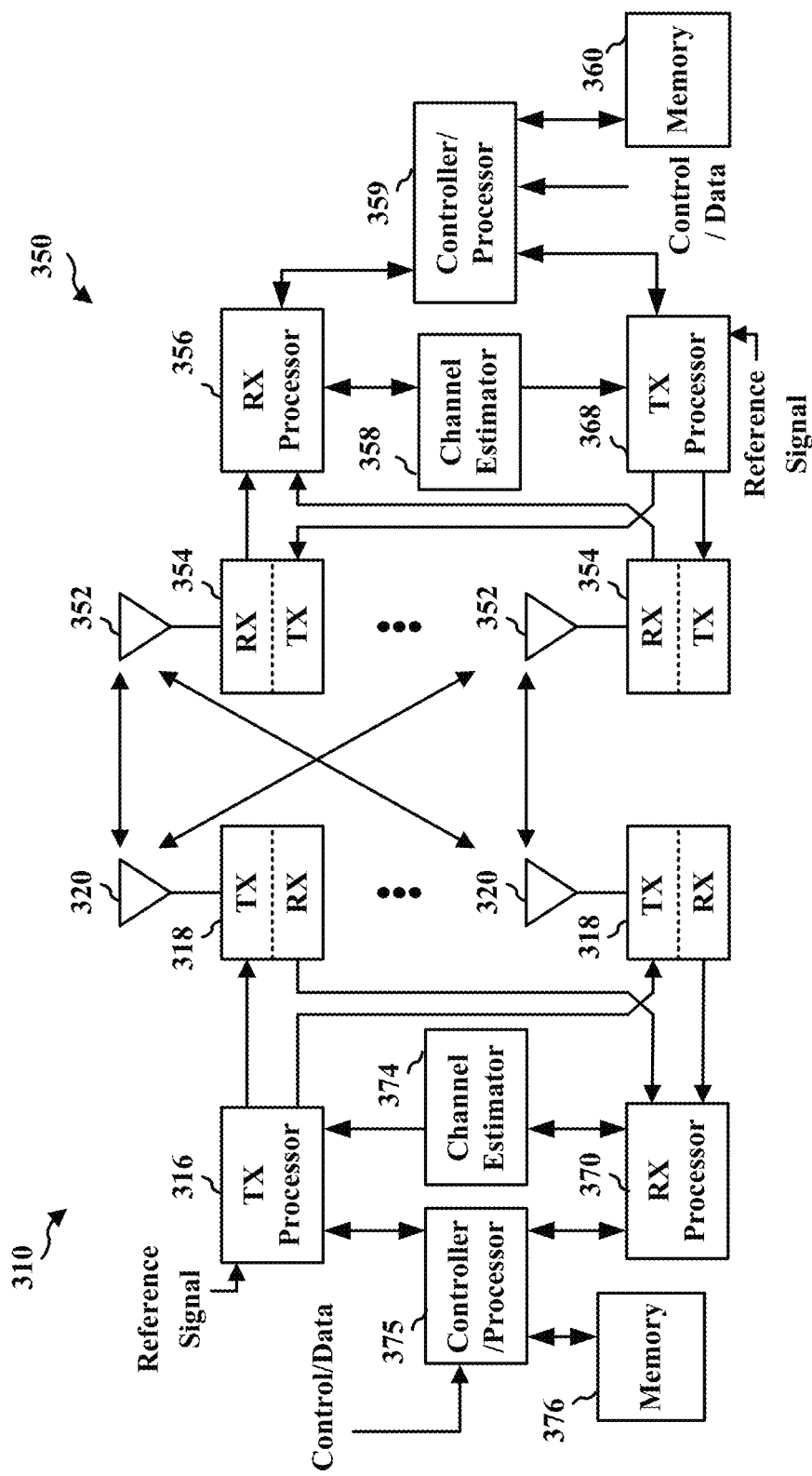
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communication systems, UEs may be configured to support multiple universal subscriber identity modules (USIMs). UEs may be configured to support two or more USIMs, where each USIM may belong to a different network operator. In some instances, a UE that supports dual USIMs may be active (e.g., connected) on both USIMs. In such instances, the capabilities on each link may need to be reduced in comparison to a single active USIM. The UE may request a reduced capability or temporary capability restriction when the dual USIMs (or multiple USIMs) are active at the UE. The reduced capability or temporary capability restriction may be utilized to prevent or counter overheating of the UE, as well as similar temporary events.

Figure 4:
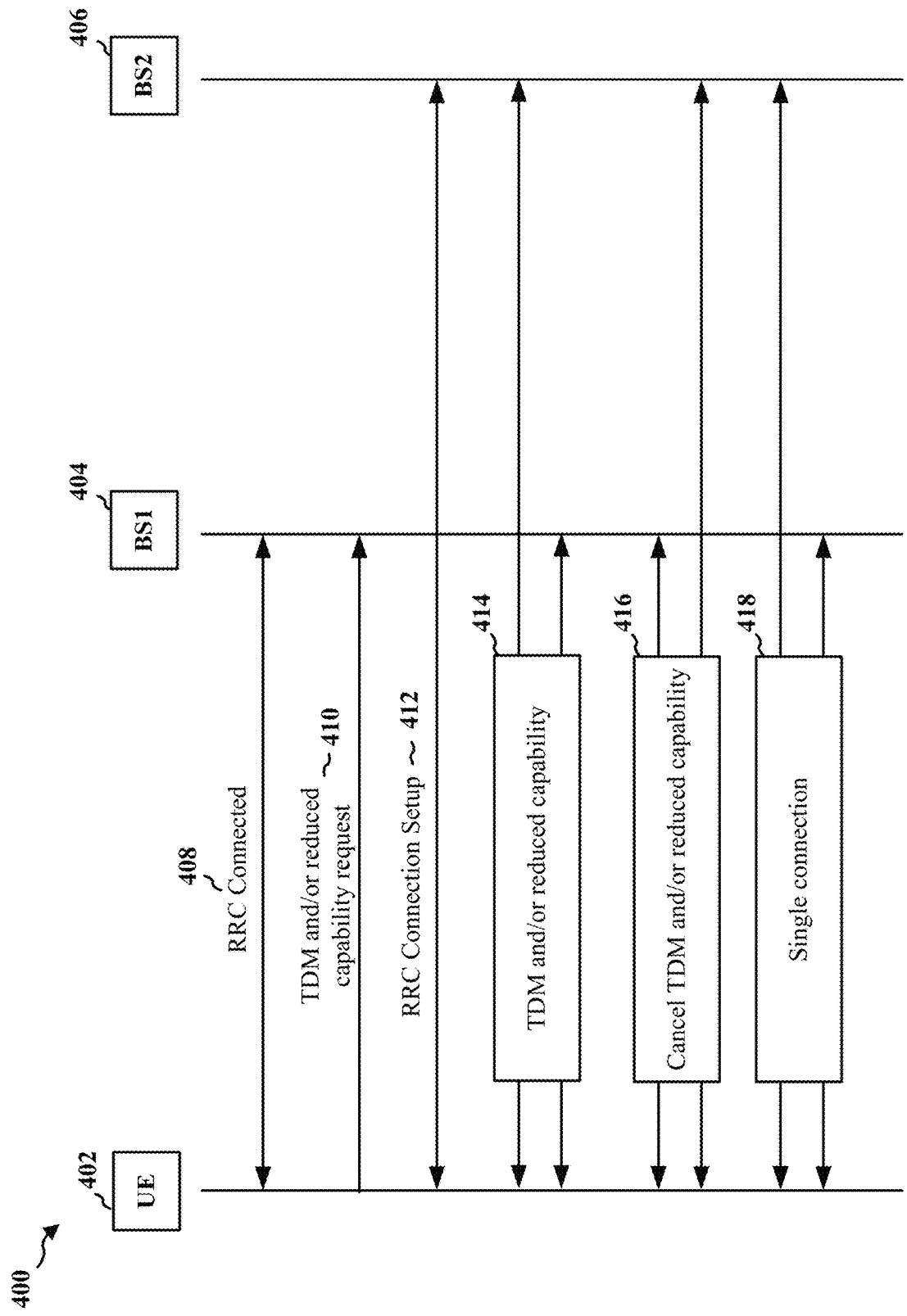
FIG. 4 illustrates an example of dual connected UE.

FIG. 4 illustrates an example 400 of a dual connected UE. The example 400 includes a UE 402, a first base station BS1 404, and a second base station BS2 406. The UE 402 may select one of the USIMs for an initial request if in an idle state. For example, the UE 402 may be RRC connected 408 with BS1 404, where a first USIM is associated with the BS1 404. The UE 402, at 410, may transmit to the BS1 404 TDM and/or a reduced capability request. In some instances, the UE 402, at 412, may initiate an RRC connection setup with BS2 406, where a second USIM is associated with the BS2 406. At 414, the UE 402 may transmit to BS1 404 and/or BS2 406 TDM and/or a reduced capability. At 416, the UE 402 may transmit to BS1 404 and/or BS2 406 an indication to cancel TDM and/or the reduced capability. At 418, the UE 402 may establish a single connection with one of BS1 404 or BS2 406.

The UE having multiple USIMs may split RF/baseband resources when multiple links are active. The UE may split RF/baseband resources if TDM is not used for both downlink and uplink. The UE may inform or request a capability change for a first USIM, when the UE is active on a second USIM. For example, a first request may occur during or after the UE initiates connection setup/resume with the second USIM. Further updates may occur as the configuration on each link changes, e.g., addition of secondary cells or bandwidth part modification. The UE configured to request dynamic capability may be a temporary state where some capabilities may be limited, e.g., due to hardware sharing, interference, or overheating. The dynamic capability may be based on RRC signaling which may reduce performance for multiple USIMs.

Aspects presented herein provide a configuration to enhance the efficiency of dynamic UE capability signaling for multiple USIMs. For example, aspects presented herein may allow a UE to indicate or request to operate using modified UE capabilities in order to operate based on the modified UE capabilities when multiple USIMs are active at the UE.

A capability change may depend on band combinations of both links in use which may change over time. The signaling may limit or minimize interruption and inefficiency during transition until capability reconfiguration is complete. The request for the UE capability change may be initiated by the UE. For example, the request may be transmitted via UAI or a new RRC message may be used. In some instances, a number of iterations to converge on the UE capability may occur. Multiple negotiations between the UE and the base station may increase latency or cause disruptions on the other USIM link. In some instances, the capability change may not be visible to the core network, but may be visible in some instances (e.g., profiles).

The signaling for dynamic UE capability may include extending UAI framework, delta signaling with respect to a baseline capacity, configuring multiple capabilities (e.g., profiles) in advance, or signaling full reduced/expanded UE capability. In some aspects, the UE may be configured to initiate the signaling. Negotiation between the UE and base station may occur, e.g., a base station may offer an alternative or the UE may suggest a modified capability in response to a rejection from the base station. The UE may also be configured to request a duration for which the new or modified capability may be valid, which may lead to reduced signaling overhead when the UE reverts back to the original capability. For example, a timer may be started when a base station confirmation is received by the UE in response to a request from the UE for the modified capabilities. The UE may request an extension of the timer, as well as requesting a termination of the timer prior to the expiration of the timer based on the activity of the other link. In some instances, when the timer expires, the UE may revert back to the original capability prior to the request for the modified capabilities.

Wireless communication systems, such as NR, may utilize UAI to request different component carrier bandwidth and MIMO layers. This may be utilized to minimize the effects of overheating of the UE, as well as a power savings feature. The signaling may be based on RRC signaling, however, the UE may only signal lower capability and the reporting frequency may be controlled by the network.

UAI may be extended to include additional parameters or a similar message. For example, a response message may be included to UAI to suggest alternative parameters or to acknowledge a request for alternative parameters. For example, UAI may include an IE indicating a modified subset of UE capabilities of a set of UE capabilities that may be utilized when multiple USIMs are active at the UE. UAI may request changes to certain capabilities due to overheating at the UE, such as reducedMaxCCs (e.g., DL and UL), reducedMaxBW-FRJ, reducedMaxBW-FR2, reducedMaxMIMO-LayersFR1 (e.g., DL and UL), reducedMaxMIMO-LayersFR2 (e.g., DL and UL). UAI may also include the following: idc-Assistance-r16: affected frequencies, drx-Preference-r16: inactivity timer, short and long cycle, short cycle timer, maxBW-Preference-r16: FR1 and FR2 separately, maxCC-Preference-r16: DL and UL, maxMIMO-LayerPreference-r16, minSchedulingOffset-Preference-r16, or releasePreference-r16.

In instances where delta signalling may be utilized, the UE may be configured to request new values for the capabilities to be modified. For example, the UE may request new values for the capabilities to be modified. Delta signalling may be applicable for inter-RAT. For example, a first USIM may be on LTE and a second USIM may be on NR dual connectivity (DC) (NR-DC) and the capability change may occur on the second USIM, while the UE may detach or re-attach on the first USIM. Delta signalling of the actual UE capability IE (e.g., UE-NR-Capability) may assist in reducing signalling overhead and enhancing flexibility.

In some instances, a single IE may be configured such that all parameters are "Need ON" or "Need OR", such that the base station may use the earlier value or remove the value if a new value is not present. In some instances, delta signalling may allow for the deletion from a baseline capacity. For example, the UE may signal (e.g., UE-NR-Capability-reduce) which may include the capabilities to be removed from the current capacity. A separate signaling from the UE or the expiration of a timer may revoke the reduction and revert the UE to the original capability.

In instances where UE profiles are utilized, the UE profiles may provide a faster adaptation. For example, the change to a new profile may be signaled via Layer-1 (L1) or Layer-2 (L2) signaling. Additional profiles may be configured during the lifetime of the connection. In some instances, a profile may be formed during an initial UE capability transfer, which may use a common set of parameters for all profiles or may use feature sets. The profile may specify additional parameters. A UE profile may be regulated based on the bands and/or features supported by the base station. For example, during connection setup, the base station may limit such combinations (e.g., based on supported and intended configurations), so as to not have a prohibitively large number of profiles. In some instances, feature set groups may be used to further limit the signaling size. The UE profiles may be stored in the Access Stratum (AS) context while in inactive mode and may be forwarded to neighbor base station during mobility.

In some aspects, each profile may be formed as a separate UE capability. In such aspects, the UE may signal multiple UE capabilities each having an index or identifier to be used for future dynamic changes. For example, the parameter UE-CapabilityRAT-ContainerList may comprise multiple UE capabilities.

In some aspects, each profile may be formed by adding additional capabilities to a baseline capability. In such aspects, additional IEs may be added or overwritten to the baseline capability (e.g., UE-NR-Capability) for each baseline. In some aspects, such for band combination (BC) capabilities, the feature-set structure may simplify the signaling by adding additional feature set (FS) for each profile. In some aspects, each profile may define different values for IEs.

In some aspects, the UE may request a repetition of the UE capability transfer. The UE, when a change to the capability is needed, may request the start of the UE capability transfer. For example, the UE may determine a change at the UE, such as determining that multiple USIMs are active at the UE, and may initiate the UE capability transfer, such that the UE may indicate a change to the capability in association with the determined change at the UE.

Figure 5:
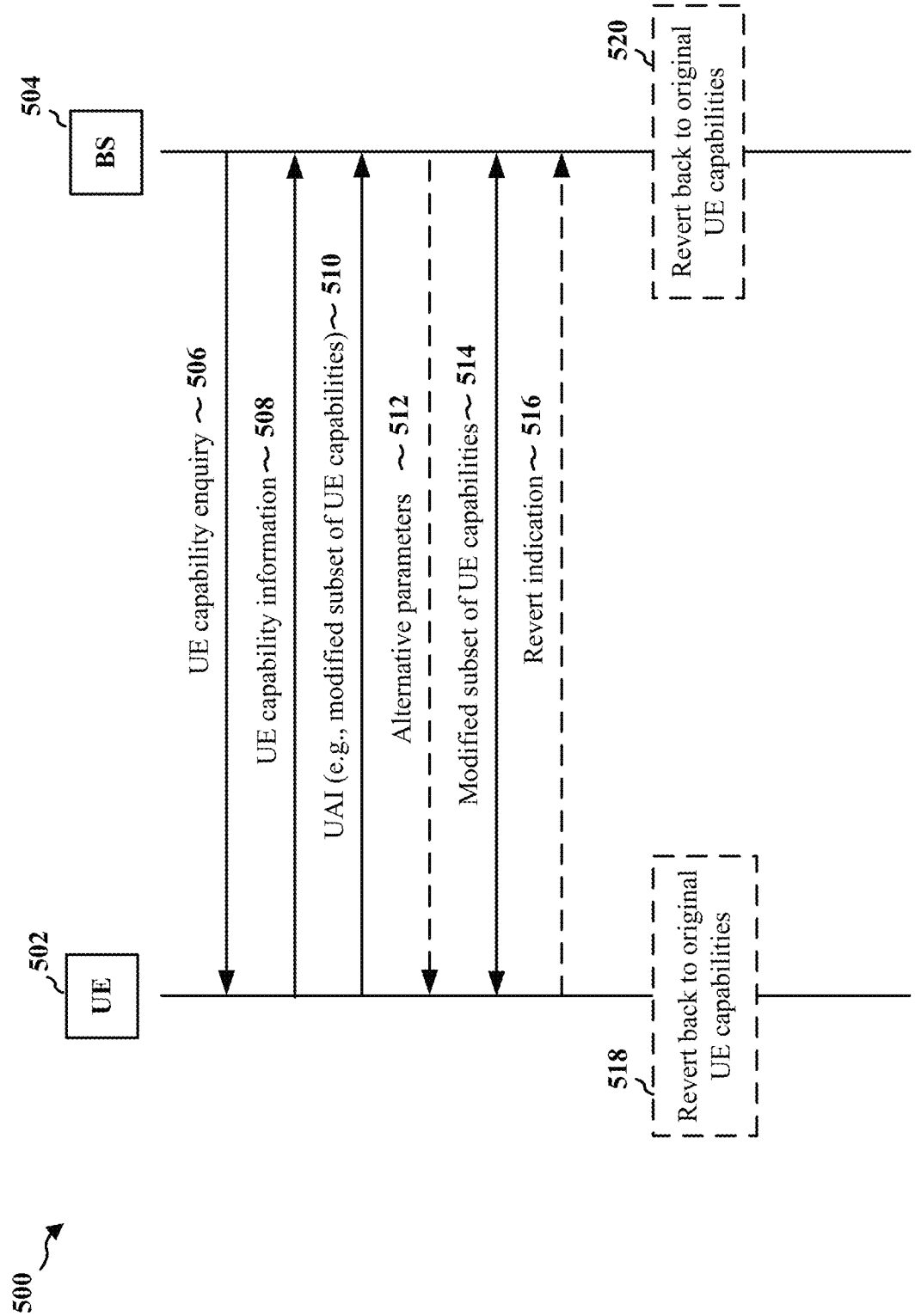
FIG. 5 is a call flow diagram of signaling between a UE and a base station.

FIG. 5 is a call flow diagram 500 of signaling between a UE 502 and a base station 504. The base station 504 may be configured to provide at least one cell. The UE 502 may be configured to communicate with the base station 504. For example, in the context of FIG. 1, the base station 504 may correspond to base station 102/180 and, accordingly, the cell may include a geographic coverage area 110 in which communication coverage is provided and/or small cell 102' having a coverage area 110'. Further, a UE 502 may correspond to at least UE 104. In another example, in the context of FIG. 3, the base station 504 may correspond to base station 310 and the UE 502 may correspond to UE 350. Optional aspects are illustrated with a dashed line.

As illustrated at 506, the base station 504 may transmit a UE capability enquiry. The base station may transmit the UE capability enquiry to the UE 502. The UE 502 may receive the UE capability enquiry.

As illustrated at 508, the UE 502 may transmit, to the base station 504, UE capability information. The UE 502 may transmit, to the base station 504, UE capability information in response to the UE capability enquiry. The base station 504 may receive the UE capability information. The UE capability information may include a set of UE capabilities.

As illustrated at 510, the UE 502 may transmit, to the base station 504, a UAI. The UE 502 may transmit, to the base station 504, the UAI including an IE indicating a modified subset of UE capabilities of the set of UE capabilities. The UE 502 may transmit the UAI including the IE indicating the modified subset of UE capabilities of the set of UE capabilities when multiple USIMs are active at the UE 502. The base station 504 may receive the UAI from the UE 502. In some aspects, the modified subset of UE capabilities may comprise reduced UE capabilities.

In some aspects, the UE 502 may determine that multiple USIMs are active at the UE 502. In some aspects, the UAI may be transmitted upon the determination that multiple USIMs are active at the UE 502. In some aspects, the UAI may be transmitted before the determination that the multiple USIMs are active at the UE 502.

In some aspects, for example as illustrated at 512, the base station 504 may transmit alternative parameters for the subset of UE capabilities. The base station 504 may transmit the alternative parameters for the subset of UE capabilities in response to the transmitted UAI. The base station 504 may transmit the alternative parameters to the UE 502. The UE 502 may receive the alternative parameters from the base station 504.

In some aspects, the base station 504 may transmit an acknowledgement in response to the transmitted UAI. The base station 504 may transmit the acknowledgement, to the UE 502, in response to the transmitted UAI. The UE 502 may receive the acknowledgement from the base station 504 in response to the transmitted UAI.

As illustrated at 514, the UE 502 may operate based on the modified subset of UE capabilities. The UE 502 may operate based on the modified subset of UE capabilities when multiple USIMs are active at the UE 502. The base station 504 may communicate with the UE 502 based on the modified subset of UE capabilities. The base station 504 may communicate with the UE 502 based on the modified subset of UE capabilities when multiple USIMs are active at the UE 502.

In some aspects, the UE 502 may determine that one USIM is active. The UE 502 may determine that one USIM is active at the UE 502. In some aspects, the UE 502 may determine that multiple USIMs are no longer active at the UE 502, such that only one USIM is active at the UE 502.

In some aspects, for example as illustrated at 516, the UE 502 may transmit information to the base station 504 indicating the base station 504 to revert back to original UE capabilities. The UE 502 may transmit the information to the base station 504 indicating the base station 504 to revert back to the original UE capabilities for the subset of UE capabilities. The UE 502 may transmit the information to the base station 504 indicating the base station 504 to revert back to the original UE capabilities based on the determination that one USIM is active. The base station 504 may receive, from the UE 502, the information indicating for the base station to revert back to the original UE capabilities for the subset of UE capabilities.

In some aspects, for example as illustrated at 518, the UE 502 may revert back to the original UE capabilities for the subset of UE capabilities. In some aspects, the UE 502 may revert back to the original UE capabilities for the subset of UE capabilities based on an expiration of a timer. The timer may start if the UE 502 operates based on the modified subset of UE capabilities. In some aspects, the UE 502 may revert back to the original UE capabilities for the subset of UE capabilities based on the determination that one USIM is active at the UE 502. In such instances, the UE 502 may revert to the original UE capabilities due to multiple USIMs no longer being active at the UE 502, such that the UE 502 does not need to operate using modified UE capabilities.

In some aspects, for example as illustrated at 520, the base station 504 may revert back to the original UE capabilities for the subset of UE capabilities. In some aspects, the base station 504 may revert back to the original UE capabilities in response to receiving the information, from the UE 502, indicating the base station 504 to revert back to the original UE capabilities. The UE 502 may transmit the information indicating the base station 504 to revert back to the original UE capabilities based at least on one USIM being active at the UE 502. In some aspect, the base station 504 may revert back to the original UE capabilities for the subset of UE capabilities based on an expiration of a timer. The timer may start if the UE 502 operates based on the modified subset of UE capabilities.

In some aspects, the UE 502 may transmit a request to extend the timer. The UE 502 may transmit the request to extend the timer based at least on multiple USIMs active at the UE 502. The UE 502 may transmit the request to extend the timer to the base station 504. In some aspects, the UE 502 may transmit a request to terminate the timer prior to the expiration of the timer. The UE 502 may transmit the request to terminate the timer prior to the expiration of the timer based at least on multiple USIMs active at the UE 502. The base station 504 may receive the request to extend the timer or to terminate the timer prior to the expiration of the timer from the UE 502. In some aspects, the request may be transmitted via Layer-1 (L1) or Layer-2 (L2) signaling.

Figure 6:
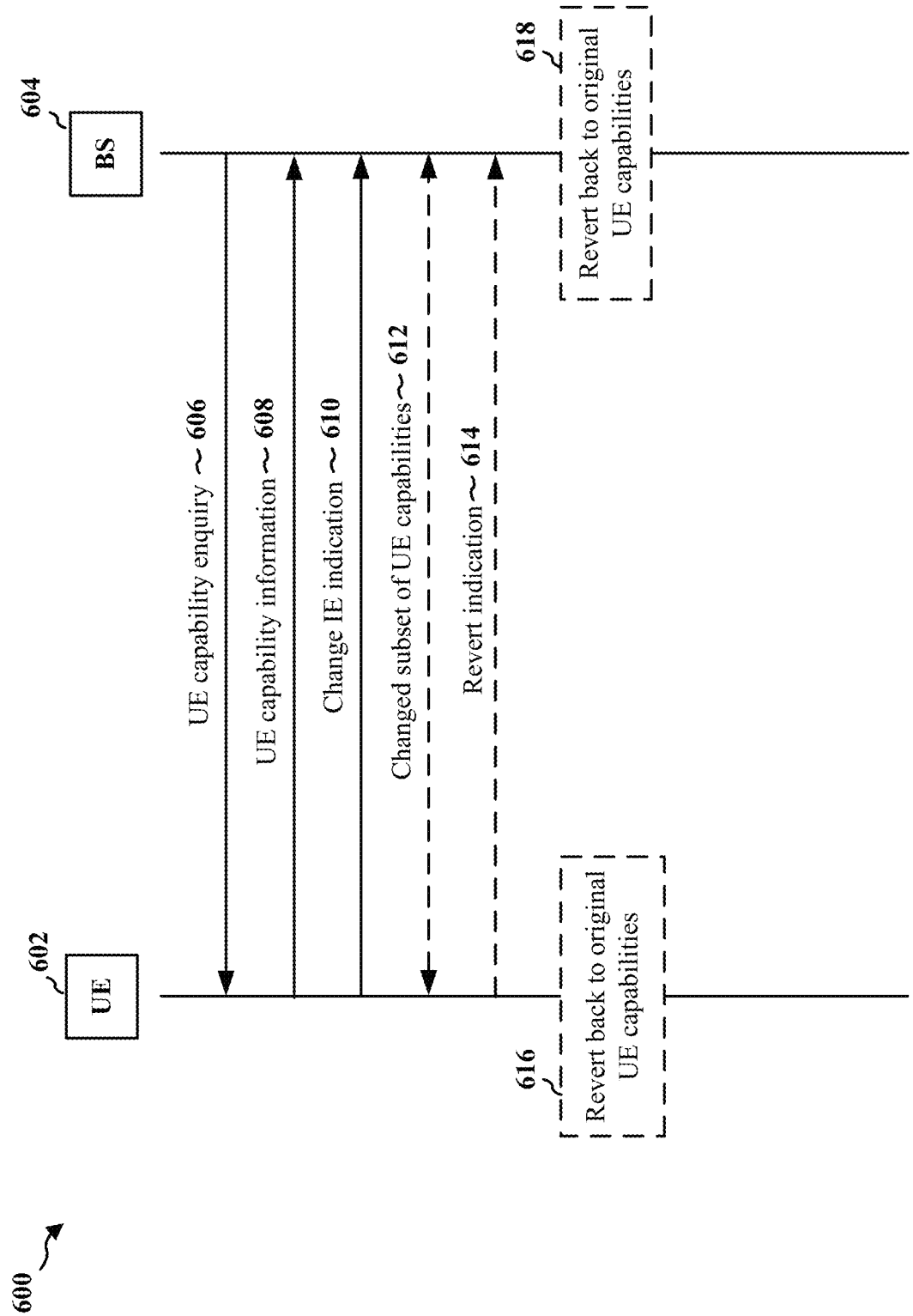
FIG. 6 is a call flow diagram of signaling between a UE and a base station.

FIG. 6 is a call flow diagram 600 of signaling between a UE 602 and a base station 604. The base station 604 may be configured to provide at least one cell. The UE 602 may be configured to communicate with the base station 604. For example, in the context of FIG. 1, the base station 604 may correspond to base station 102/180 and, accordingly, the cell may include a geographic coverage area 110 in which communication coverage is provided and/or small cell 102' having a coverage area 110'. Further, a UE 602 may correspond to at least UE 104. In another example, in the context of FIG. 3, the base station 604 may correspond to base station 310 and the UE 602 may correspond to UE 350. Optional aspects are illustrated with a dashed line.

As illustrated at 606, the base station 604 may transmit a UE capability enquiry. The base station 604 may transmit the UE capability enquiry to the UE 602. The UE 602 may receive the UE capability enquiry from the base station 604.

As illustrated at 608, the UE 602 may transmit, to the base station 604, UE capability information. The UE 602 may transmit, to the base station 604, the UE capability information in response to the UE capability enquiry. The UE capability information may include a set of UE capabilities. The base station 604 may receive the UE capability information from the UE 602.

As illustrated at 610, the UE 604 may transmit a capability change IE. The UE 602 may transmit the capability change IE indicating a subset of UE capabilities of the set of UE capabilities to change. The base station 604 may receive the capability change IE from the UE 602. In some aspects, the capability change IE is transmitted through one of radio resource control (RRC) signaling or UAI.

In some aspects, the UE 602 may determine that multiple USIMs are active at the UE 602. In some aspects, the capability change IE may be transmitted in response to determining that multiple USIMs are active at the UE 602.

In some aspects, for example as illustrated at 612, the UE 602 may operate based on the changed subset of UE capabilities. The UE 602 may operate based on the changed subset of UE capabilities when multiple USIMs are active at the UE 602. In some aspects, the base station 604 may communicate with the UE 602 based on the changed subset of UE capabilities. The base station 604 may communicate with the UE 602 based on the changed subset of UE capabilities when multiple USIMs are active at the UE 602.

In some aspects, the UE 602 may determine subsequently that one USIM is active. The UE 602 may determine subsequently that one USIM is active at the UE 602.

In some aspects, for example as illustrated at 614, the UE 602 may transmit information to the base station 604 indicating for the base station 604 to revert back to original UE capabilities. The UE 602 may transmit the information to the base station 604 indicating the base station 604 to revert back to the original UE capabilities for the subset of UE capabilities. The UE 602 may transmit the information to the base station 604 indicating the base station 604 to revert back to the original UE capabilities, based on the determination that one USIM is active at the UE 602. The base station 604 may receive the information indicating the base station 604 to revert back to the original UE capabilities from the UE 602.

In some aspects, for example as illustrated at 616, the UE 602 may revert back to the original UE capabilities for the subset of UE capabilities. The UE 602 may revert back to the original UE capabilities for the subset of UE capabilities based on expiration of a timer. The timer may start if the UE 602 operates based on the changed subset of UE capabilities. In some aspects, the UE 602 may revert back to the original UE capabilities for the subset of UE capabilities based on the determination that one USIM is active at the UE 602. In such instances, the UE 602 may revert to the original UE capabilities due to multiple USIMs no longer being active at the UE 602, such that the UE 602 does not need to operate using the changed subset of UE capabilities.

In some aspects, for example as illustrated at 618, the base station 604 may revert back to the original UE capabilities. In some aspects, the base station 604 may revert back to the original UE capabilities in response to receiving the information, from the UE 602, indicating the base station 604 to revert back to the original UE capabilities. The UE 602 may transmit the information indicating the base station 604 to revert back to the original UE capabilities based at least on one USIM being active at the UE 602. In some aspects, the base station 604 may revert back to the original UE capabilities for the subset of UE capabilities based on the expiration of the timer. In some aspects, the timer may start if the UE operates based on the changed subset of UE capabilities.

In some aspects, the UE 602 may transmit a request to extend the timer. The UE 602 may transmit the request to extend the timer based at least on multiple USIMs active at the UE 602. The UE 602 may transmit the request to extend the timer to the base station 604. In some aspects, the UE 602 may transmit a request to terminate the timer prior to the expiration of the timer. The UE 602 may transmit the request to terminate the timer prior to the expiration of the timer based at least on multiple USIMs active at the UE 602. The base station 604 may receive the request to extend the timer or to terminate the timer prior to the expiration of the timer from the UE 602. In some aspects, the request may be transmitted via L1 or L2 signaling.

Figure 7:
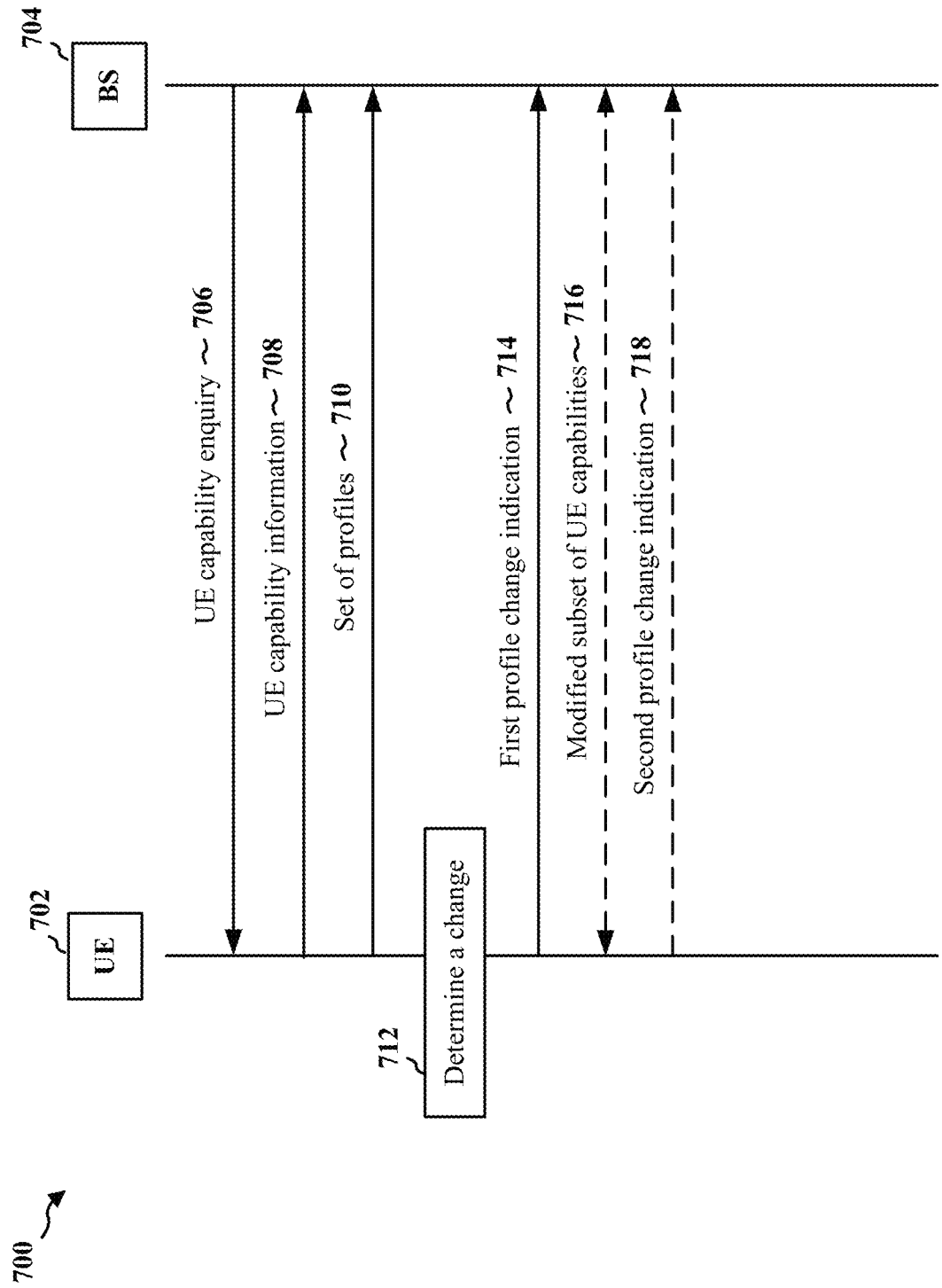
FIG. 7 is a call flow diagram of signaling between a UE and a base station.

FIG. 7 is a call flow diagram 700 of signaling between a UE 702 and a base station 704. The base station 704 may be configured to provide at least one cell. The UE 702 may be configured to communicate with the base station 704. For example, in the context of FIG. 1, the base station 704 may correspond to base station 102/180 and, accordingly, the cell may include a geographic coverage area 110 in which communication coverage is provided and/or small cell 102' having a coverage area 110'. Further, a UE 702 may correspond to at least UE 104. In another example, in the context of FIG. 3, the base station 704 may correspond to base station 310 and the UE 702 may correspond to UE 350. Optional aspects are illustrated with a dashed line.

As illustrated at 706, the base station 704 may transmit a UE capability enquiry. The base station 704 may transmit the UE capability enquiry to the UE 702. The UE 702 may receive the UE capability enquiry from the base station 704.

As illustrated at 708, the UE 702 may transmit, to the base station 704, UE capability information. The UE 702 may transmit, to the base station 704, the UE capability information in response to the UE capability enquiry. The base station 704 may receive the UE capability information from the UE 702. The UE capability information may include a set of UE capabilities.

As illustrated at 710, the UE 702 may transmit a set of profiles. The UE 702 may transmit the set of profiles to the base station 704. The base station 704 may receive the set of profiles from the UE 702. Each profile of the set of profiles may indicate a modified subset of UE capabilities of the set of UE capabilities.

As illustrated at 712, the UE 702 may determine a change at the UE 702. In some aspects, determining the change at the UE 702 may comprise determining that multiple USIMs are active at the UE 702.

As illustrated at 714, the UE 702 may transmit information to the base station 704 indicating a change to a first profile of the set of profiles. The UE 702 may transmit the information to the base station 704 indicating the change to the first profile of the set of profiles in response to the determined change at the UE 702. The UE 702 may transmit the information to the base station 704 indicating the change to the first profile of the set of profiles, based on the determined change at the UE 702. The base station 704 may receive the information, from the UE 702, indicating the change to the first profile of the set of profiles. In some aspects, the determined change at the UE 702 may comprise a determination that multiple USIMs are active at the UE 702.

In some aspects, for example as illustrated at 716, the UE 702 may operate based on the modified subset of UE capabilities associated with the first profile. The UE 702 may operate based on the modified subset of UE capabilities associated with the first profile while multiple USIMs are active at the UE 702. In some aspects, the base station 704 may communicate with the UE 702 based on the modified subset of UE capabilities. The base station 704 may communicate with the UE 702 based on the modified subset of UE capabilities associated with the first profile while multiple USIMs are active at the UE 702.

In some aspects, the UE 702 may determine that one USIM is active. The UE 702 may determine that one USIM is active at the UE 702. In such instances, the UE 702 may determine that multiple USIMs are not active at the UE 702, such that only one USIM is active at the UE 702.

In some aspects, for example as illustrated at 718, the UE 702 may transmit information to the base station 704 indicating a change to a second profile of the set of profiles. The UE 702 may transmit the information to the base station 704 indicating the change to the second profile of the set of profiles, based on the determination that one USIM is active at the UE 702. The base station 704 may receive the information, form the UE 702, indicating the change to the second profile. In some aspects, the information to the base station 704 indicating the change to the second profile of the set of profiles may be transmitted via L1 or L2 signaling.

In some aspects, the UE 702 may determine that a timer expired in association with the first profile. In some aspects, the timer may start if the UE 702 operates based on the modified subset of UE capabilities.

In some aspects, the UE 702 may transmit information to the base station 704 indicating a change to a second profile of the set of profiles. The UE 702 may transmit the information to the base station 704 indicating the change to the second profile of the set of profiles, based on the determination that the timer expired in association with the first profile. The base station 704 may receive the information, from the UE 702, indicating the change to the second profile based on the determination that the timer, associated with the first profile, has expired. In some aspects, the UE 702 may transmit, to the base station 704, a request to extend the timer or a request to terminate the timer prior to the expiration of the timer. The UE 702 may transmit the request to extend the timer or terminate the timer prior to the expiration of the timer based at least on whether multiple USIMs are active at the UE 702.

Figure 8:
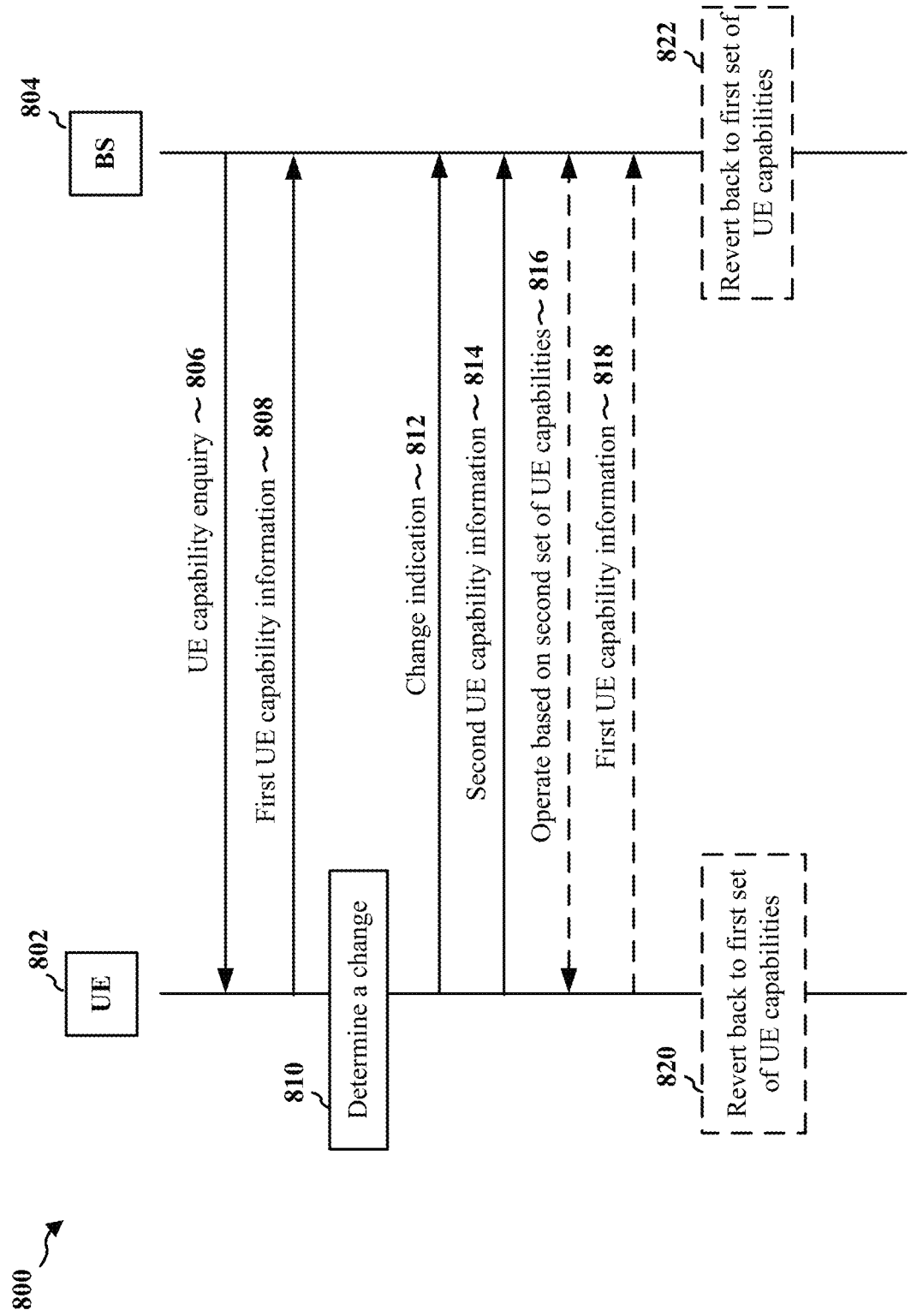
FIG. 8 is a call flow diagram of signaling between a UE and a base station.

FIG. 8 is a call flow diagram 800 of signaling between a UE 802 and a base station 804. The base station 804 may be configured to provide at least one cell. The UE 802 may be configured to communicate with the base station 804. For example, in the context of FIG. 1, the base station 804 may correspond to base station 102/180 and, accordingly, the cell may include a geographic coverage area 110 in which communication coverage is provided and/or small cell 102' having a coverage area 110'. Further, a UE 802 may correspond to at least UE 104. In another example, in the context of FIG. 3, the base station 804 may correspond to base station 310 and the UE 802 may correspond to UE 350. Optional aspects are illustrated with a dashed line.

As illustrated at 806, the base station 804 may transmit a UE capability enquiry. The base station 804 may transmit the UE capability enquiry to the UE 802. The UE 802 may receive the UE capability enquiry from the base station 804.

As illustrated at 808, the UE 802 may transmit, to the base station 804, first UE capability information. The UE 802 may transmit, to the base station 804, the first UE capability information in response to the UE capability enquiry. The base station 804 may receive the first UE capability information from the UE 802. The first UE capability information may include a first set of UE capabilities.

As illustrated at 810, the UE 802 may determine a change at the UE 802. In some aspects, determining the change at the UE 802 may comprise determining that multiple USIMs are active at the UE 802.

As illustrated at 812, the UE 802 may transmit, to the base station 804, an indication to indicate the change at the UE. The indication may inform the base station 804 of the change at the UE, such that the base station 804 may initiate the UE capability enquiry process. The base station 804 may receive the indication to initiate the UE capability enquiry process from the UE 802. The base station 804 may receive the indication to initiate the UE capability enquiry process based at least on a change at the UE. In some aspects, the change at the UE 802 may comprise multiple USIMs active at the UE.

As illustrated at 814, the UE 802 may transmit second UE capability information. The UE 802 may transmit the second UE capability information in association with the determined change at the UE 802. The UE 802 may transmit the second UE capability information in association with the determined change at the UE 802, to the base station 804. The base station 804 may receive the second UE capability information from the UE 802. The second UE capability information may include a second set of UE capabilities.

In some aspects, for example as illustrated at 816, the UE 802 may operate based on the second set of UE capabilities. The UE 802 may operate based on the second set of UE capabilities while multiple USIMs are active at the UE 802. The UE 802 may operate based on the second set of UE capabilities while multiple USIMs are active at the UE 802, and based on the first set of UE capabilities when one USIM is active at the UE 802. In some aspects, the base station 804 may communicate with the UE 802 based on the second set of UE capabilities. The base station 804 may communicate with the UE 802 based on the second set of UE capabilities while multiple USIMs are active at the UE 802. The base station 804 may communicate with the UE 802 based on the second set of UE capabilities while multiple USIMs are active at the UE 802, and based on the first set of UE capabilities when one USIM is active at the UE 802. In some aspects, the UE 802 may perform a random access channel (RACH) procedure to confirm a capability change between the first and second sets of UE capabilities. In some aspects, the UE 802 may reset at least one of MAC, radio link control (RLC), or packet data convergence protocol (PDCP) in response to a capability change between the first and second sets of UE capabilities. In some aspects, at least one of the MAC, RLC, or PDCP may be reset in response to the capability change between the first and second set of UE capabilities if the capability change impacts operation of at least one of the MAC, RLC, or PDCP.

In some aspects, the UE 802 may determine that one USIM is active. The UE 802 may determine that one USIM is active at the UE 802. In some aspects, the UE 802 may transmit, to the base station, an indication to indicate that one USIM is active to initiate a UE capability enquiry process. The base station 804 may initiate the UE capability enquiry process with the UE 802 based upon receipt of the indication indicating that one USIM is active at the UE 802. The base station 804 may receive the indication from the UE 802.

In some aspects, for example as illustrated at 818, the UE 802 may transmit the first UE capability information. The UE 802 may transmit the first UE capability information, based on the determination that one USIM is active at the UE 802. The base station 804 may receive the first UE capability information from the UE 802.

In some aspects, for example as illustrated at 820, the UE 802 may revert back to the first set of UE capabilities. In some aspects, the UE 802 may revert back to the first set of UE capabilities based on the determination that one USIM is active at the UE 802. In some aspects, the UE 802 may revert back to the first set of UE capabilities in response to transmitting the first UE capability information, to the base station 804, based on the determination that one USIM is active at the UE 802, such that multiple USIMs are not active at the UE 802. In some aspects, the UE 802 may revert back to the first set of UE capabilities based on an expiration of a timer. The timer may start if the UE 802 operates based on the second set of UE capabilities.

In some aspects, for example as illustrated at 822, the base station 804 may revert back to the first set of UE capabilities. In some aspects, the base station 804 may revert back to the first set of UE capabilities based on the determination that one USIM is active at the UE 802. In some aspects, the base station 804 may revert back to the first set of UE capabilities in response to receiving the first UE capability information, from the UE 802, based on the determination that one USIM is active at the UE 802, such that multiple USIMs are not active at the UE 802. In some aspects, the base station 804 may revert back to the first set of UE capabilities based on an expiration of a timer. The timer may start if the UE 802 operates based on the second set of UE capabilities.

In some aspects, the UE 802 may transmit a request to extend the timer. The UE 802 may transmit the request to extend the timer based at least on whether multiple USIMs active at the UE 802. The UE 802 may transmit the request to extend the timer to the base station 804. In some aspects, the UE 802 may transmit a request to terminate the timer prior to the expiration of the timer. The UE 802 may transmit the request to terminate the timer prior to the expiration of the timer based at least on whether multiple USIMs active at the UE 806. The base station 804 may receive the request to extend the timer or to terminate the timer prior to the expiration of the timer from the UE 802. In some aspects, the request may be transmitted via L1 or L2 signaling.

Figure 9:
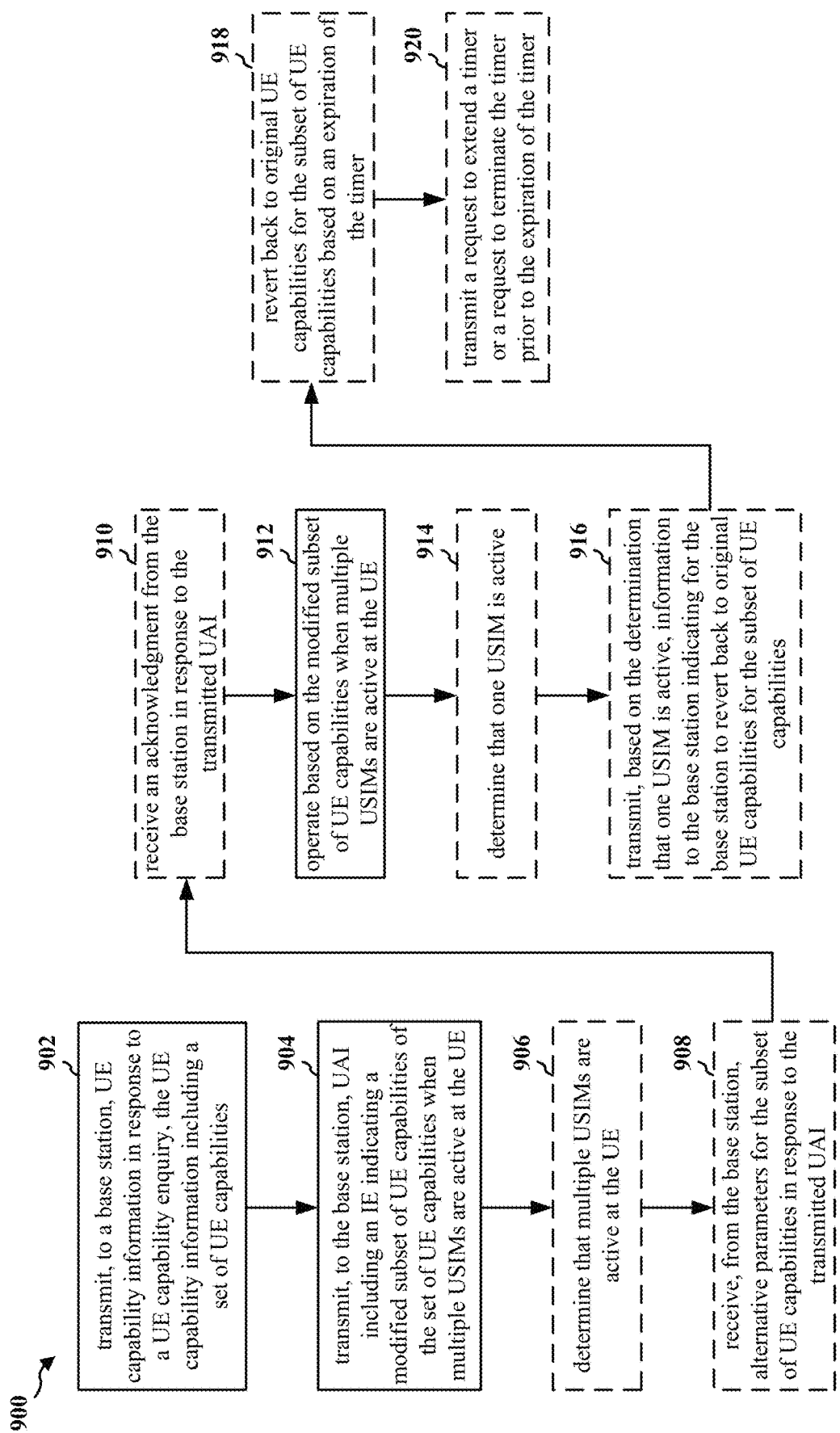
FIG. 9 is a flowchart of a method of wireless communication.

FIG. 9 is a flowchart 900 of a method of wireless communication. The method may be performed by a UE or a component of a UE (e.g., the UE 104, 402, 502, 602, 702, 802; the apparatus 1302; the cellular baseband processor 1304, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to utilize UAI to indicate a modified UE capabilities when multiple USIMs are active at the UE.

At 902, the UE may transmit, to a base station, UE capability information. For example, 902 may be performed by transmission component 1334 of apparatus 1302. The UE may transmit, to the base station, UE capability information in response to a UE capability enquiry. The UE capability information may include a set of UE capabilities.

At 904, the UE may transmit, to the base station, UAI. For example, 904 may be performed by transmission component 1334 of apparatus 1302. The UE may transmit, to the base station, the UAI including an IE indicating a modified subset of UE capabilities of the set of UE capabilities. The UE may transmit the UAI including the IE indicating the modified subset of UE capabilities of the set of UE capabilities when multiple USIMs are active at the UE. In some aspects, the modified subset of UE capabilities may comprise reduced UE capabilities.

In some aspects, for example at 906, the UE may determine that multiple USIMs are active at the UE. For example, 906 may be performed by determination component 1340 of apparatus 1302. In some aspects, the UAI may be transmitted upon determining that the multiple USIMs are active at the UE. In some aspects, the UAI may be transmitted before determining that the multiple USIMs are active at the UE.

In some aspects, for example at 908, the UE may receive alternative parameters for the subset of UE capabilities. For example, 908 may be performed by reception component 1330 of apparatus 1302. The UE may receive alternative parameters for the subset of UE capabilities in response to the transmitted UAI. The UE may receive the alternative parameters from the base station.

In some aspects, for example at 910, the UE may receive an acknowledgment from the base station. For example, 910 may be performed by reception component 1330 of apparatus 1302. The UE may receive the acknowledgement from the base station in response to the transmitted UAI.

At 912, the UE may operate based on the modified subset of UE capabilities. For example, 912 may be performed by operate component 1342 of apparatus 1302. The UE may operate based on the modified subset of UE capabilities when multiple USIMs are active at the UE.

In some aspects, for example at 914, the UE may determine that one USIM is active. For example, 914 may be performed by determination component 1340 of apparatus 1302. The UE may determine that one USIM is active at the UE.

In some aspects, for example at 916, the UE may transmit information to the base station indicating for the base station to revert back to original UE capabilities. For example, 916 may be performed by transmission component 1334 of apparatus 1302. The UE may transmit information to the base station indicating for the base station to revert back to original UE capabilities for the subset of UE capabilities. The UE may transmit the information to the base station indicating the base station to revert back to the original UE capabilities based on the determination that one USIM is active.

In some aspects, for example at 918, the UE may revert back to original UE capabilities for the subset of UE capabilities. For example, 918 may be performed by revert component 1344 of apparatus 1302. The UE may revert back to original UE capabilities for the subset of UE capabilities based on an expiration of a timer. The timer may start if the UE operates based on the modified subset of UE capabilities.

In some aspects, for example at 920, the UE may transmit a request to extend the timer or a request to terminate the timer prior to the expiration of the timer. For example, 920 may be performed by transmission component 1334 of apparatus 1302. The UE may transmit the request to extend the timer or the request to terminate the timer prior to the expiration of the timer, based at least on multiple USIMs active at the UE. In some aspects, the request may be transmitted via L1 or L2 signaling.

Figure 10:
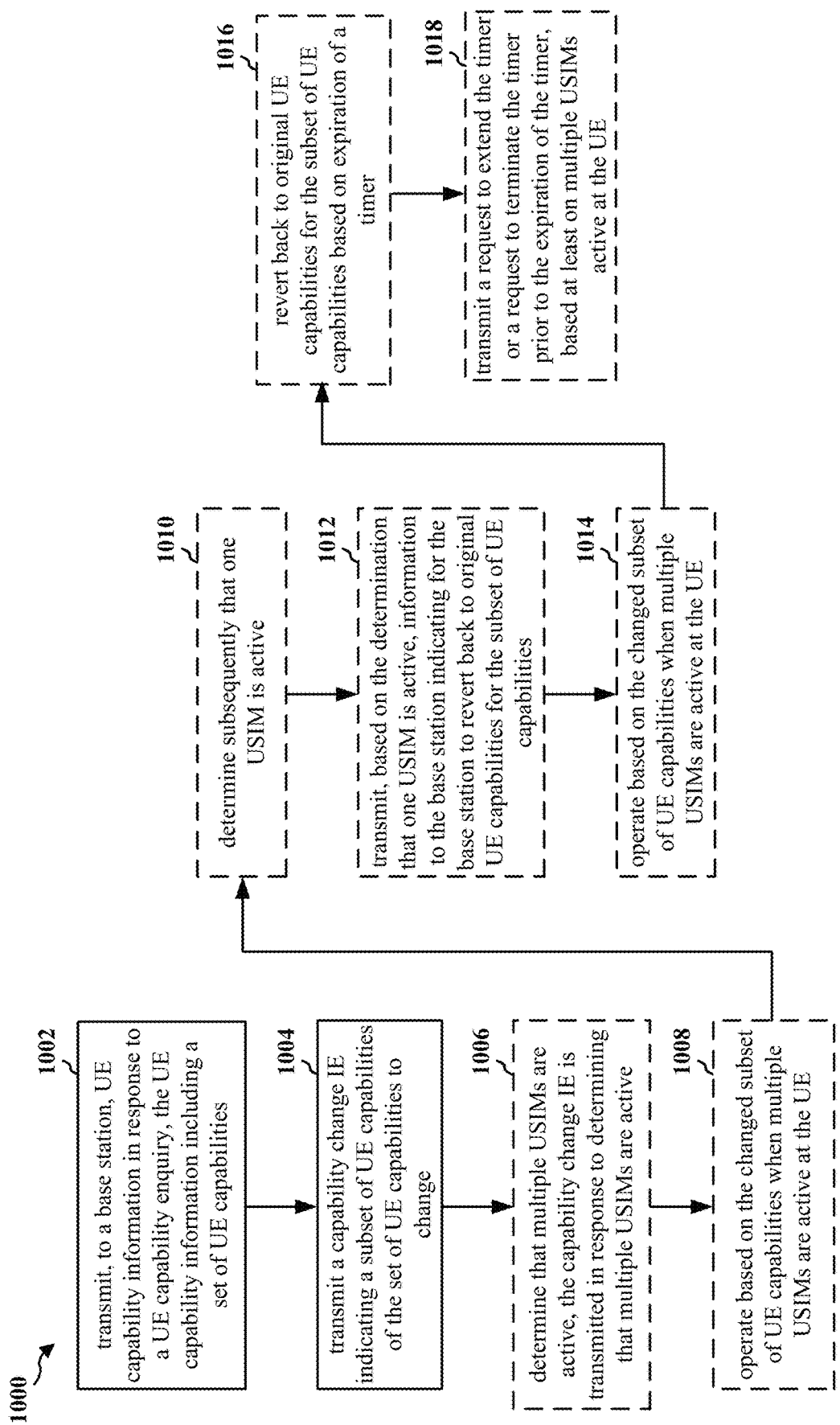
FIG. 10 is a flowchart of a method of wireless communication.

FIG. 10 is a flowchart 1000 of a method of wireless communication. The method may be performed by a UE or a component of a UE (e.g., the UE 104, 402, 502, 602, 702, 802; the apparatus 1302; the cellular baseband processor 1304, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to indicate a change of UE capabilities when multiple USIMs are active at the UE.

At 1002, the UE may transmit, to a base station, UE capability information. For example, 1002 may be performed by transmission component 1334 of apparatus 1302. The UE may transmit, to the base station, the UE capability information in response to a UE capability enquiry. The UE capability information may include a set of UE capabilities.

At 1004, the UE may transmit a capability change IE. For example, 1004 may be performed by transmission component 1334 of apparatus 1302. The UE may transmit the capability change IE indicating a subset of UE capabilities of the set of UE capabilities to change. In some aspects, the capability change IE is transmitted through one of RRC signaling or UAI.

In some aspects, for example at 1006, the UE may determine that multiple USIMs are active. For example, 1006 may be performed by determination component 1340 of apparatus 1302. In some aspects, the capability change IE may be transmitted in response to determining that multiple USIMs are active.

In some aspects, for example at 1008, the UE may operate based on the changed subset of UE capabilities. For example, 1008 may be performed by operate component 1342 of apparatus 1302. The UE may operate based on the changed subset of UE capabilities when multiple USIMs are active at the UE.

In some aspects, for example at 1010, the UE may determine subsequently that one USIM is active. For example, 1010 may be performed by determination component 1340 of apparatus 1302. The UE may determine subsequently that one USIM is active at the UE.

In some aspects, for example at 1012, the UE may transmit information to the base station indicating for the base station to revert back to original UE capabilities. For example, 1012 may be performed by transmission component 1334 of apparatus 1302. The UE may transmit information to the base station indicating for the base station to revert back to original UE capabilities for the subset of UE capabilities. The UE may transmit information to the base station indicating the base station to revert back to the original UE capabilities, based on the determination that one USIM is active.

In some aspects, for example at 1014, the UE may operate based on the changed subset of UE capabilities. For example, 1014 may be performed by operate component 1342 of apparatus 1302. The UE may operate based on the changed subset of UE capabilities when multiple USIMs are active at the UE.

In some aspects, for example at 1016, the UE may revert back to original UE capabilities for the subset of UE capabilities. For example, 1016 may be performed by revert component 1344 of apparatus 1302. The UE may revert back to original UE capabilities for the subset of UE capabilities based on expiration of a timer.

In some aspects, for example at 1018, the UE may transmit a request to extend the timer or a request to terminate the timer prior to the expiration of the timer. For example, 1018 may be performed by transmission component 1334 of apparatus 1302. The UE may transmit the request to extend the timer or the request to terminate the timer prior to the expiration of the timer, based at least on multiple USIMs active at the UE. In some aspects, the request may be transmitted via L1 or L2 signaling. In some aspects, the timer may start if the UE operates based on the changed subset of UE capabilities.

Figure 11:
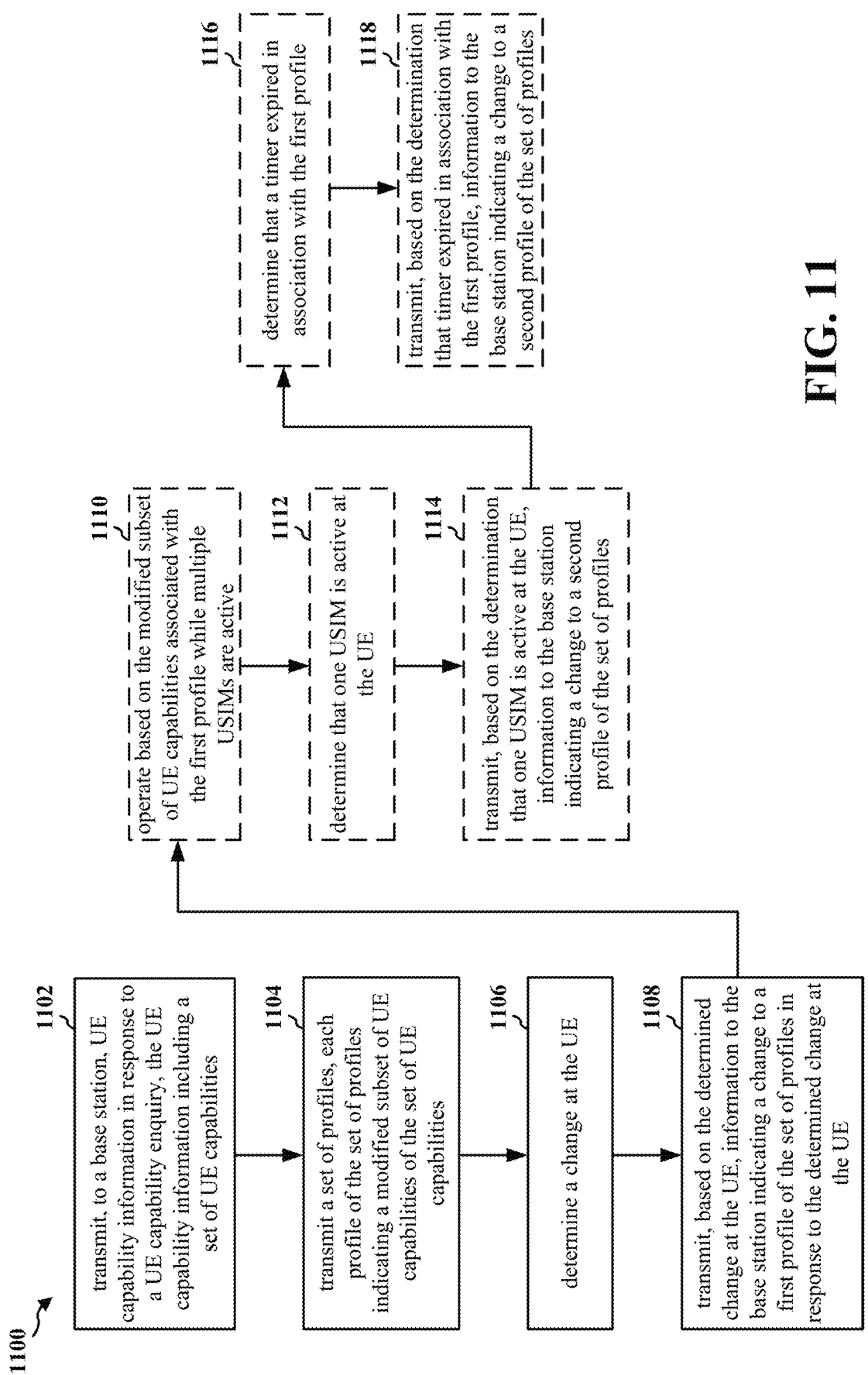
FIG. 11 is a flowchart of a method of wireless communication.

FIG. 11 is a flowchart 1100 of a method of wireless communication. The method may be performed by a UE or a component of a UE (e.g., the UE 104, 402, 502, 602, 702, 802; the apparatus 1302; the cellular baseband processor 1304, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to change to profiles from a set of profiles, where each profile includes modified UE capabilities.

At 1102, the UE may transmit, to a base station, UE capability information. For example, 1102 may be performed by transmission component 1334 of apparatus 1302. The UE may transmit, to the base station, the UE capability information in response to a UE capability enquiry. The UE capability information may include a set of UE capabilities.

At 1104, the UE may transmit a set of profiles. For example, 1104 may be performed by transmission component 1334 of apparatus 1302. Each profile of the set of profile s may indicate a modified subset of UE capabilities of the set of UE capabilities.

At 1106, the UE may determine a change at the UE. For example, 1106 may be performed by determination component 1340 of apparatus 1302. In some aspects, determining the change at the UE may comprise determining that multiple USIMs are active at the UE.

At 1108, the UE may transmit information to the base station indicating a change to a first profile of the set of profiles. For example, 1108 may be performed by transmission component 1334 of apparatus 1302. The UE may transmit the information to the base station indicating the change to the first profile of the set of profiles in response to the determined change at the UE. The UE may transmit the information to the base station indicating the change to the first profile of the set of profiles, based on the determined change at the UE.

In some aspects, for example at 1110, the UE may operate based on the modified subset of UE capabilities associated with the first profile. For example, 1110 may be performed by operate component 1342 of apparatus 1302. The UE may operate based on the modified subset of UE capabilities associated with the first profile while multiple USIMs are active.

In some aspects, for example at 1112, the UE may determine that one USIM is active. For example, 1112 may be performed by determination component 1340 of apparatus 1302. The UE may determine that one USIM is active at the UE.

In some aspects, for example at 1114, the UE may transmit information to the base station indicating a change to a second profile of the set of profiles. For example, 1114 may be performed by transmission component 1334 of apparatus 1302. The UE may transmit information to the base station indicating a change to a second profile of the set of profiles, based on the determination that one USIM is active at the UE. In some aspects, the information to the base station indicating the change to the second profile of the set of profiles may be transmitted via L1 or L2 signaling.

In some aspects, for example at 1116, the UE may determine that a timer expired in association with the first profile. For example, 1116 may be performed by determination component 1340 of apparatus 1302. In some aspects, the timer may start if the UE operates based on the modified subset of UE capabilities.

In some aspects, for example at 1118, the UE may transmit information to the base station indicating a change to a second profile of the set of profiles. For example, 1118 may be performed by transmission component 1334 of apparatus 1302. The UE may transmit the information to the base station indicating a change to a second profile of the set of profiles, based on the determination that timer expired in association with the first profile.

Figure 12:
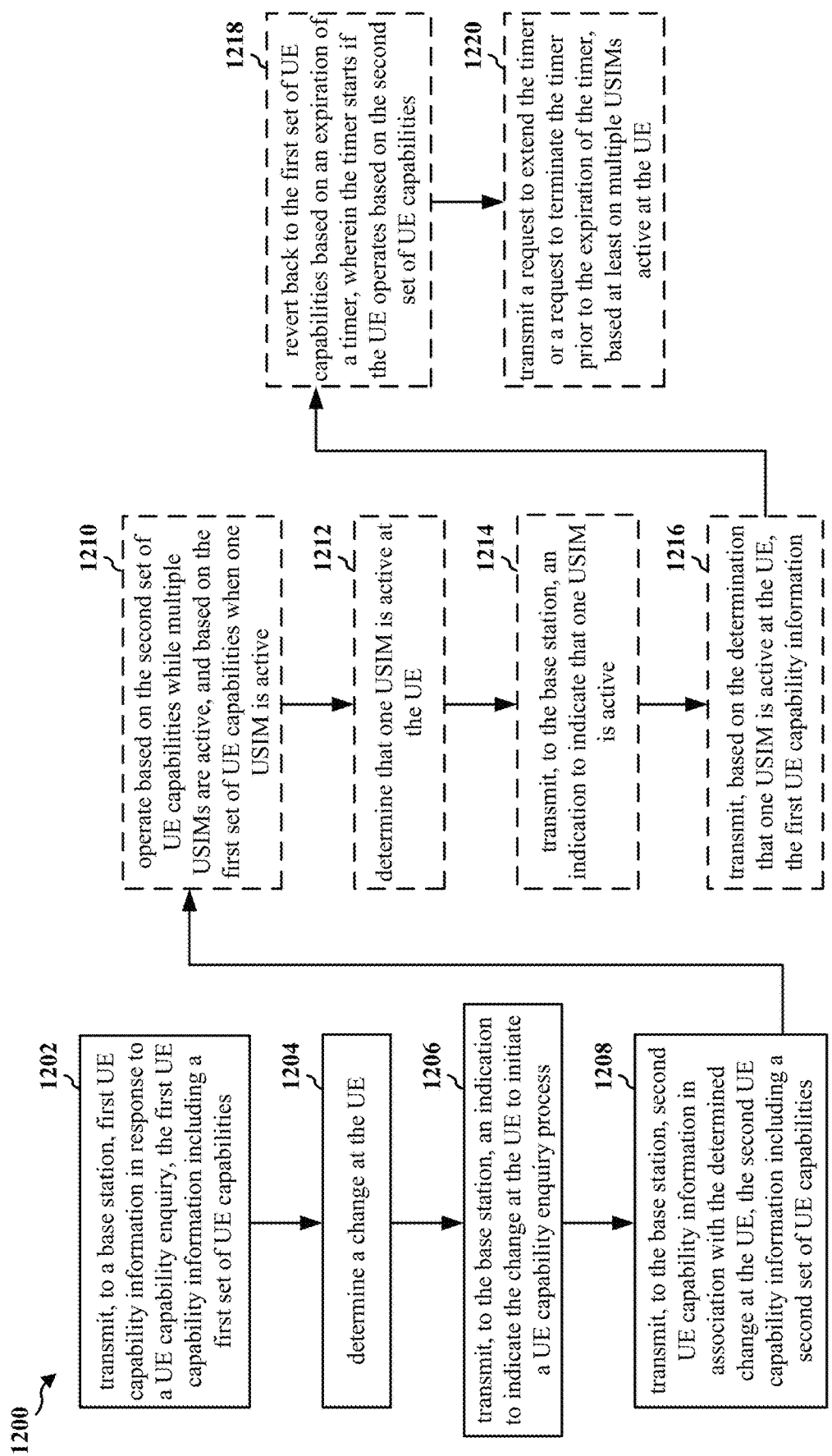
FIG. 12 is a flowchart of a method of wireless communication.

FIG. 12 is a flowchart 1200 of a method of wireless communication. The method may be performed by a UE or a component of a UE (e.g., the UE 104, 402, 502, 602, 702, 802; the apparatus 1302; the cellular baseband processor 1304, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to indicate a change of UE capabilities when multiple USIMs are active at the UE.

At 1202, the UE may transmit, to a base station, first UE capability information. For example, 1202 may be performed by transmission component 1334 of apparatus 1302. The UE may transmit, to the base station, the first UE capability information in response to a UE capability enquiry. The first UE capability information may include a first set of UE capabilities.

At 1204, the UE may determine a change at the UE. For example, 1204 may be performed by determination component 1340 of apparatus 1302. In some aspects, determining the change at the UE may comprise determining that multiple USIMs are active at the UE.

At 1206, the UE may transmit, to the base station, an indication to indicate the change at the UE. For example, 1206 may be performed by initiation component 1346 of apparatus 1302. The indication may inform the base station of the change at the UE, such that the base station may initiate the UE capability enquiry process based at least on the change at the UE.

At 1208, the UE may transmit second UE capability information. For example, 1208 may be performed by transmission component 1334 of apparatus 1302. The UE may transmit the second UE capability information in association with the determined change at the UE. The UE may transmit the second UE capability information in association with the determined change at the UE, to the base station. The second UE capability information may include a second set of UE capabilities.

In some aspects, for example at 1210, the UE may operate based on the second set of UE capabilities. For example, 1210 may be performed by operate component 1342 of apparatus 1302. The UE may operate based on the second set of UE capabilities while multiple USIMs are active. The UE may operate based on the second set of UE capabilities while multiple USIMs are active, and based on the first set of UE capabilities when one USIM is active. In some aspects, the UE may perform a random access channel (RACH) procedure to confirm a capability change between the first and second sets of UE capabilities. In some aspects, the UE may reset at least one of MAC, radio link control (RLC), or packet data convergence protocol (PDCP) in response to a capability change between the first and second sets of UE capabilities. In some aspects, at least one of the MAC, RLC, or PDCP may be reset in response to the capability change between the first and second set of UE capabilities if the capability change impacts operation of at least one of the MAC, RLC, or PDCP.

In some aspects, for example at 1212, the UE may determine that one USIM is active. For example, 1212 may be performed by determination component 1340 of apparatus 1302. The UE may determine that one USIM is active at the UE.

In some aspects, for example at 1214, the UE may transmit, to the base station, an indication to indicate that one USIM is active to initiate a UE capability enquiry process. For example, 1214 may be performed by initiation component 1346 of apparatus 1302. The base station may initiate the UE capability enquiry process with the UE based upon receipt of the indication indicating that one USIM is active.

In some aspects, for example at 1216, the UE may transmit the first UE capability information. For example, 1216 may be performed by transmission component 1334 of apparatus 1302. The UE may transmit the first UE capability information, based on the determination that one USIM is active at the UE.

In some aspects, for example at 1218, the UE may revert back to the first set of UE capabilities. For example, 1218 may be performed by revert component 1344 of apparatus 1302. The UE may revert back to the first set of UE capabilities based on an expiration of a timer. The timer may start if the UE operates based on the second set of UE capabilities.

In some aspects, for example at 1220, the UE may transmit a request to extend the timer or a request to terminate the timer prior to the expiration of the timer. For example, 1220 may be performed by transmission component 1334 of apparatus 1302. The UE may transmit the request to extend the timer or the request to terminate the timer prior to the expiration of the timer, based at least on multiple USIMs active at the UE. In some aspects, the request may be transmitted via L1 or L2 signaling.

Figure 13:
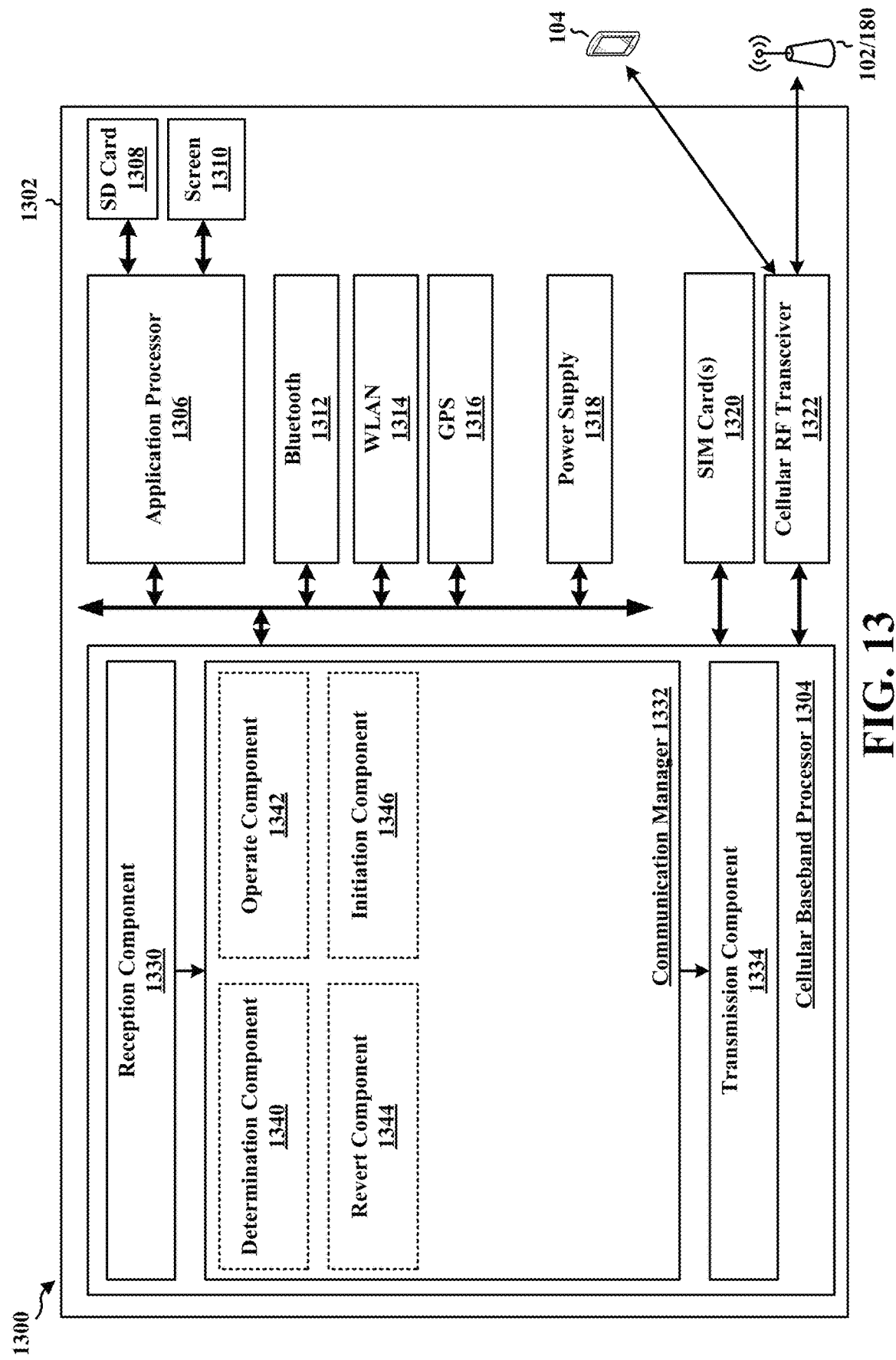
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the cellular baseband processor 1304, and in another configuration, the apparatus 1302 may be the entire UE (e.g., see 350 of FIG. 3) and include the aforediscussed additional modules of the apparatus 1302.

The communication manager 1332 includes a determination component 1340 that is configured to determine that multiple USIMs are active at the UE, e.g., as described in connection with 906 of FIG. 9. The determination component 1340 may be configured to determine that one USIM is active, e.g., as described in connection with 914 of FIG. 9. The determination component 1340 may be configured to determine that multiple USIMs are active, e.g., as described in connection with 1006 of FIG. 10. the determination component 1340 may be configured to determine subsequently that one USIM is active, e.g., as described in connection with 1010 of FIG. 10. The determination component 1340 may be configured to determine a change at the UE, e.g., as described in connection with 1106 of FIG. 11. The determination component 1340 may be configured to determine that one USIM is active, e.g., as described in connection with 1112 of FIG. 11. The determination component 1340 may be configured to determine that a timer expired in association with the first profile, e.g., as described in connection with 1116 of FIG. 11. The determination component 1340 may be configured to determine a change at the UE, e.g., as described in connection with 1204 of FIG. 12. The determination component 1340 may be configured to determine that one USIM is active, e.g., as described in connection with 1212 of FIG. 12. The communication manager 1332 further includes an operate component 1342 that is configured to operate based on the modified subset of UE capabilities, e.g., as described in connection with 912 of FIG. 9. The operate component 1342 may be configured to operate based on the changed subset of UE capabilities, e.g., as described in connection with 1008 of FIG. 10. The operate component 1342 may be configured to operate based on the changed subset of UE capabilities, e.g., as described in connection with 1014 of FIG. 10. The operate component 1342 may be configured to operate based on the modified subset of UE capabilities associated with the first profile, e.g., as described in connection with 1110 of FIG. 11. The operate component 1342 may be configured to operate based on the second set of UE capabilities, e.g., as described in connection with 1210 of FIG. 12. The communication manager 1332 further includes a revert component 1344 that is configured to revert back to original UE capabilities for the subset of UE capabilities, e.g., as described in connection with 918 of FIG. 9. The revert component 1344 may be configured to revert back to original UE capabilities for the subset of UE capabilities, e.g., as described in connection with 1016 of FIG. 10. The revert component 1344 may be configured to revert back to the first set of UE capabilities, e.g., as described in connection with 1218 of FIG. 12. The communication manager 1332 further includes an initiation component 1346 that is configured to transmit, to the base station, an indication to indicate the change at the UE to initiate a UE capability enquiry process, e.g., as described in connection with 1206 of FIG. 12. The initiation component 1346 may be configured to transmit, to the base station, an indication to indicate that one USIM is active to initiate a UE capability enquiry process, e.g., as described in connection with 1214 of FIG. 12. The reception component 1330 may be configured to receive alternative parameters for the subset of UE capabilities, e.g., as described in connection with 908 of FIG. 9. The reception component 1330 may be configured to receive an acknowledgment from the base station, e.g., as described in connection with 910 of FIG. 9. The transmission component 1334 may be configured to transmit, to a base station, UE capability information, e.g., as described in connection with 902 of FIG. 9. The transmission component 1334 may be configured to transmit, to the base station, UAI, e.g., as described in connection with 904 of FIG. 9. The transmission component 1334 may be configured to transmit information to the base station indicating for the base station to revert back to original UE capabilities, e.g., as described in connection with 916 of FIG. 9. The transmission component 1334 may be configured to transmit a request to extend the timer or a request to terminate the timer prior to the expiration of the timer, e.g., as described in connection with 920 of FIG. 9. The transmission component 1334 may be configured to transmit, to a base station, UE capability information, e.g., as described in connection with 1002 of FIG. 10. The transmission component 1334 may be configured to transmit a capability change IE, e.g., as described in connection with 1004 of FIG. 10. The transmission component 1334 may be configured to transmit information to the base station indicating for the base station to revert back to original UE capabilities, e.g., as described in connection with 1012 of FIG. 10. The transmission component 1334 may be configured to transmit a request to extend the timer or a request to terminate the timer prior to the expiration of the timer, e.g., as described in connection with 1018 of FIG. 10. The transmission component 1334 may be configured to transmit, to a base station, UE capability information, e.g., as described in connection with 1102 of FIG. 11. The transmission component 1334 may be configured to transmit a set of profiles, e.g., as described in connection with 1104 of FIG. 11. The transmission component 1334 may be configured to transmit information to the base station indicating a change to a first profile of the set of profiles, e.g., as described in connection with 1108 of FIG. 11. The transmission component 1334 may be configured to transmit information to the base station indicating a change to a second profile of the set of profiles, e.g., as described in connection with 1114 of FIG. 11. The transmission component 1334 may be configured to transmit information to the base station indicating a change to a second profile of the set of profiles, e.g., as described in connection with 1118 of FIG. 11. The transmission component 1334 may be configured to transmit, to a base station, first UE capability information, e.g., as described in connection with 1202 of FIG. 12. The transmission component 1334 may be configured to transmit second UE capability information, e.g., as described in connection with 1208 of FIG. 12. The transmission component 1334 may be configured to transmit the first UE capability information, e.g., as described in connection with 1216 of FIG. 12. The transmission component 1334 may be configured to transmit a request to extend the timer or a request to terminate the timer prior to the expiration of the timer, e.g., as described in connection with 1220 of FIG. 12.

The apparatus may include additional components that perform each of the blocks of the algorithm in the aforementioned flowcharts of FIGS. 9-12. As such, each block in the aforementioned flowcharts of FIGS. 9-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for transmitting, to a base station, UE capability information in response to a UE capability enquiry. The UE capability information including a set of UE capabilities. The apparatus includes means for transmitting, to the base station, UAI including an IE indicating a modified subset of UE capabilities of the set of UE capabilities when multiple USIMs are active at the UE. The apparatus includes means for operating based on the modified subset of UE capabilities when multiple USIMs are active at the UE. The apparatus includes means for transmitting, to a base station, UE capability information in response to a UE capability enquiry. The UE capability information including a set of UE capabilities. The apparatus includes means for transmitting a capability change IE indicating a subset of UE capabilities of the set of UE capabilities to change. The apparatus includes means for transmitting, to a base station, UE capability information in response to a UE capability enquiry. The UE capability information including a set of UE capabilities. The apparatus includes means for transmitting a set of profiles, each profile of the set of profiles indicating a modified subset of UE capabilities of the set of UE capabilities. The apparatus includes means for determining a change at the UE. The apparatus includes means for transmitting, based on the determined change at the UE, information to the base station indicating a change to a first profile of the set of profiles in response to the determined change at the UE. The apparatus includes means for transmitting, to a base station, first UE capability information in response to a UE capability enquiry. The first UE capability information including a first set of UE capabilities. The apparatus includes means for determining a change at the UE. The apparatus includes means for initiating a UE capability enquiry process with the base station upon determining the change at the UE. The apparatus includes means for transmitting, to the base station, second UE capability information in association with the determined change at the UE. The second UE capability information including a second set of UE capabilities. The apparatus further includes means for determining that multiple USIMs are active at the UE. The UAI is transmitted upon determining that the multiple USIMs are active at the UE. The apparatus further includes means for determining that multiple USIMs are active at the UE. The UAI is transmitted before determining that the multiple USIMs are active at the UE. The apparatus further includes means for receiving, from the base station, alternative parameters for the subset of UE capabilities in response to the transmitted UAI. The apparatus further includes means for receiving an acknowledgment from the base station in response to the transmitted UAI. The apparatus further includes means for determining that one USIM is active. The apparatus further includes means for transmitting, based on the determination that one USIM is active, information to the base station indicating for the base station to revert back to original UE capabilities for the subset of UE capabilities. The apparatus further includes means for reverting back to original UE capabilities for the subset of UE capabilities based on an expiration of a timer. The timer starts if the UE operates based on the modified subset of UE capabilities. The apparatus further includes means for transmitting a request to extend the timer or a request to terminate the timer prior to the expiration of the timer, based at least on multiple USIMs active at the UE. The apparatus further includes means for determining that multiple universal subscriber identity modules (USIMs) are active. The capability change IE is transmitted in response to determining that multiple USIMs are active. The apparatus further includes means for operating based on the changed subset of UE capabilities when multiple USIMs are active at the UE. The apparatus further includes means for determining subsequently that one USIM is active. The apparatus further includes means for transmitting, based on the determination that one USIM is active, information to the base station indicating for the base station to revert back to original UE capabilities for the subset of UE capabilities. The apparatus further includes means for operating based on the changed subset of UE capabilities when multiple USIMs are active at the UE. The apparatus further includes means for reverting back to original UE capabilities for the subset of UE capabilities based on expiration of a timer. The apparatus further includes means for transmitting a request to extend the timer or a request to terminate the timer prior to the expiration of the timer, based at least on multiple USIMs active at the UE. The apparatus further includes means for operating based on the modified subset of UE capabilities associated with the first profile while multiple USIMs are active. The apparatus further includes means for determining that one USIM is active at the UE. The apparatus further includes means for transmitting, based on the determination that one USIM is active at the UE, information to the base station indicating a change to a second profile of the set of profiles. The apparatus further includes means for determining that a timer expired in association with the first profile. The apparatus further includes means for transmitting, based on the determination that timer expired in association with the first profile, information to the base station indicating a change to a second profile of the set of profiles. The apparatus further includes means for operating based on the second set of UE capabilities while multiple USIMs are active, and based on the first set of UE capabilities when one USIM is active. The apparatus further includes means for determining that one USIM is active at the UE. The apparatus further includes means for initiating a UE capability enquiry process with the base station upon determining that one USIM is active. The apparatus further includes means for transmitting, based on the determination that one USIM is active at the UE, the first UE capability information. The apparatus further includes means for reverting back to the first set of UE capabilities based on an expiration of a timer. The timer starts if the UE operates based on the second set of UE capabilities. The apparatus further includes means for transmitting a request to extend the timer or a request to terminate the timer prior to the expiration of the timer, based at least on multiple USIMs active at the UE. The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
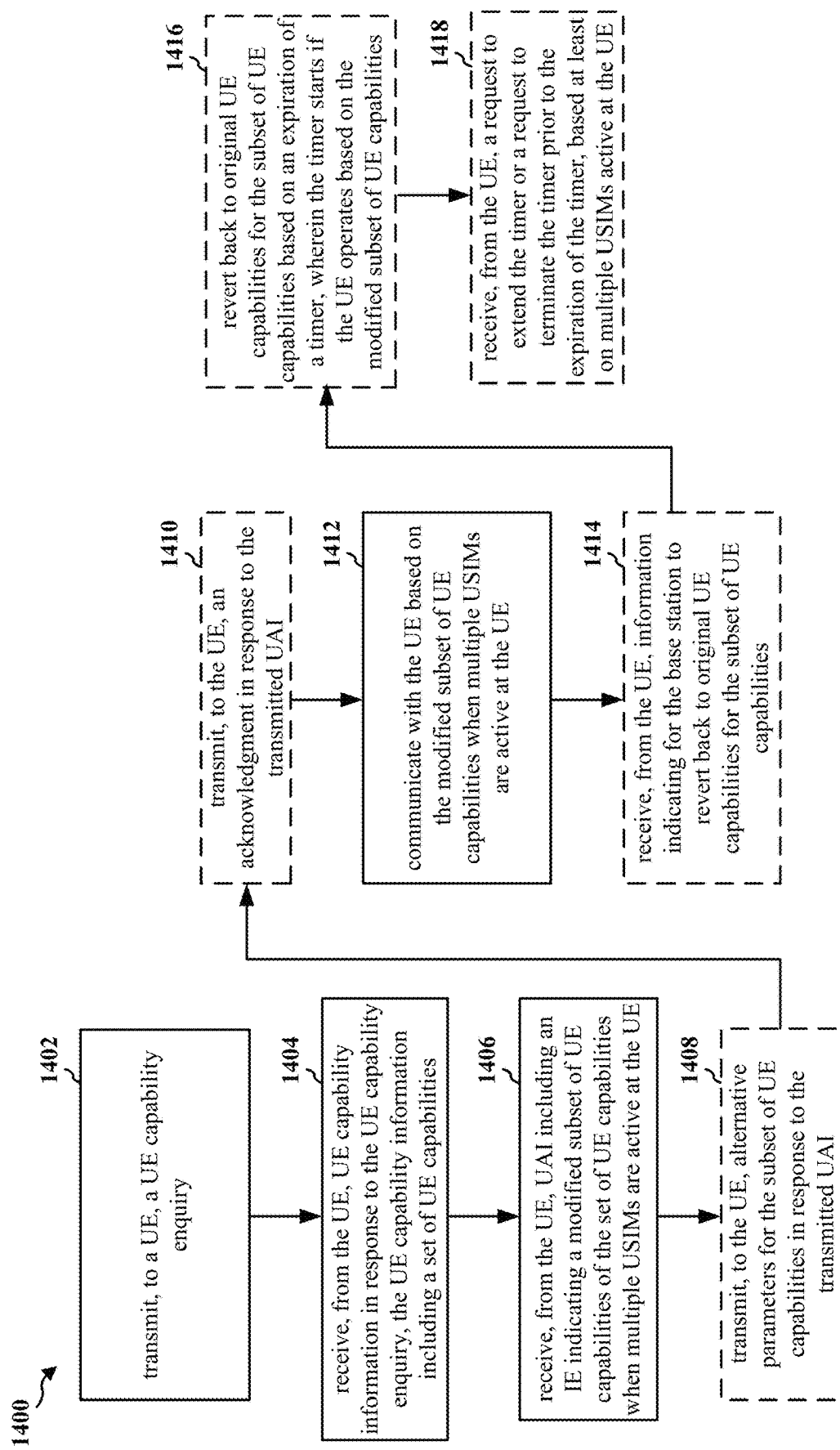
FIG. 14 is a flowchart of a method of wireless communication.

FIG. 14 is a flowchart 1400 of a method of wireless communication. The method may be performed by a base station or a component of a base station (e.g., the base station 102/180, 404, 406, 504, 604, 704, 804; the apparatus 1802; the baseband unit 1804, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to receive UAI to indicate a modified UE capabilities when multiple USIMs are active at the UE.

At 1402, the base station may transmit a UE capability enquiry. For example, 1402 may be performed by transmission component 1834 of apparatus 1802. The base station may transmit the UE capability enquiry to a UE.

At 1404, the base station may receive UE capability information. For example, 1404 may be performed by reception component 1830 of apparatus 1802. The base station may receive the UE capability information in response to the UE capability enquiry. the base station may receive, from the UE, the UE capability information in response to the UE capability enquiry. The capability information may include a set of UE capabilities.

At 1406, the base station may receive UAI including an IE. For example, 1406 may be performed by reception component 1830 of apparatus 1802. The base station may receive the UAI including the IE indicating a modified subset of UE capabilities of the set of UE capabilities when multiple USIMs are active at the UE. The base station may receive the UAI including the IE from the UE. In some aspects, the modified subset of UE capabilities may comprise reduced UE capabilities.

In some aspects, for example at 1408, the base station may transmit alternative parameters for the subset of UE capabilities. For example, 1408 may be performed by transmission component 1834 of apparatus 1802. The base station may transmit the alternative parameters for the subset of UE capabilities in response to the transmitted UAI. The base station may transmit the alternative parameters to the UE.

In some aspects, for example at 1410, the base station may transmit an acknowledgement in response to the transmitted UAI. For example, 1410 may be performed by transmission component 1834 of apparatus 1802. The base station may transmit the acknowledgement, to the UE, in response to the transmitted UAI.

At 1412, the base station may communicate with the UE based on the modified subset of UE capabilities. For example, 1412 may be performed by communication component 1840 of apparatus 1802. The base station may communicate with the UE based on the modified subset of UE capabilities when multiple USIMs are active at the UE.

In some aspects, for example at 1414, the base station may receive information indicating for the base station to revert back to original UE capabilities. For example, 1414 may be performed by reception component 1830 of apparatus 1802. The base station may receive the information indicating for the base station to revert back to the original UE capabilities for the subset of UE capabilities. The base station may receive, from the UE, the information indicating for the base station to revert back to the original UE capabilities for the subset of UE capabilities.

In some aspects, for example at 1416, the base station may revert back to original UE capabilities for the subset of UE capabilities. For example, 1416 may be performed by revert component 1842 of apparatus 1802. The base station may revert back to the original UE capabilities for the subset of UE capabilities based on an expiration of a timer. The timer may start if the UE operates based on the modified subset of UE capabilities.

In some aspects, for example at 1418, the base station may receive a request to extend the timer or a request to terminate the timer prior to the expiration of the timer. For example, 1418 may be performed by reception component 1830 of apparatus 1802. The base station may receive the request to extend the timer or the request to terminate the timer prior to the expiration of the timer, based at least one multiple USIMs active at the UE. The base station may receive the request to extend the timer or the request to terminate the timer prior to the expiration of the timer from the UE. In some aspects, the request may be transmitted via L1 or L2 signaling.

Figure 15:
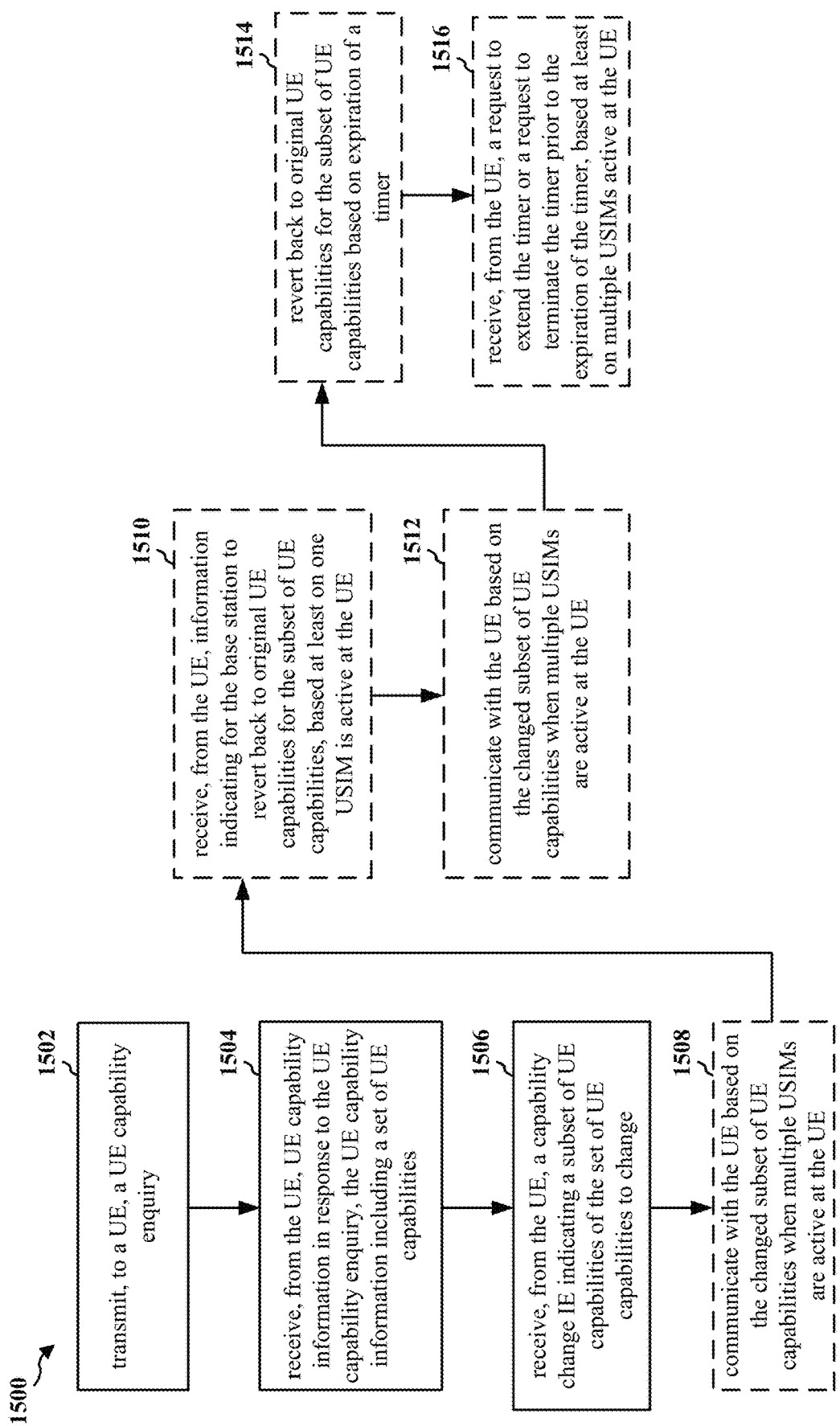
FIG. 15 is a flowchart of a method of wireless communication.

FIG. 15 is a flowchart 1500 of a method of wireless communication. The method may be performed by a base station or a component of a base station (e.g., the base station 102/180, 404, 406, 504, 604, 704, 804; the apparatus 1802; the baseband unit 1804, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to receive an indication to change UE capabilities when multiple USIMs are active at the UE.

At 1502, the base station may transmit a UE capability enquiry. For example, 1502 may be performed by transmission component 1834 of apparatus 1802. The base station may transmit the UE capability enquiry to a UE.

At 1504, the base station may receive UE capability information. For example, 1504 may be performed by reception component 1830 of apparatus 1802. The base station may receive the UE capability information in response to the UE capability enquiry. The UE capability information may include a set of UE capabilities. The base station may receive the UE capability information from the UE.

At 1506, the base station may receive a capability change IE. For example, 1506 may be performed by reception component 1830 of apparatus 1802. The base station may receive the capability change IE indicating a subset of UE capabilities of the set of UE capabilities to change. The base station may receive the capability change IE from the UE. In some aspects, the capability change IE may be transmitted through one of RRC signaling or UAI.

In some aspects, for example at 1508, the base station may communicate with the UE based on the changed subset of UE capabilities. For example, 1508 may be performed by communication component 1840 of apparatus 1802. The base station may communicate with the UE based on the changed subset of UE capabilities when multiple USIMs are active at the UE.

In some aspects, for example at 1510, the base station may receive information indicating for the base station to revert back to original UE capabilities. For example, 1510 may be performed by reception component 1830 of apparatus 1802. The base station may receive the information indicating for the base station to revert back to the original UE capabilities for the subset of UE capabilities. The base station may receive the information indicating for the base station to revert back to the original UE capabilities for the subset of UE capabilities, based at least on one USIM is active at the UE. The base station may receive the information indicating the base station to revert back to the original UE capabilities from the UE.

In some aspects, for example at 1512, the base station may communicate with the UE based on the changed subset of UE capabilities. For example, 1512 may be performed by communicate component 1840 of apparatus 1802. The base station may communicate with the UE based on the changed subset of UE capabilities when multiple USIMs are active at the UE.

In some aspects, for example at 1514, the base station may revert back to original UE capabilities. For example, 1514 may be performed by revert component 1842 of apparatus 1802. The base station may revert back to the original UE capabilities for the subset of UE capabilities based on expiration of a timer. In some aspects, the timer may start if the UE operates based on the changed subset of UE capabilities.

In some aspects, for example at 1516, the base station may receive a request to extend the timer or a request to terminate the timer prior to the expiration of the timer. For example, 1516 may be performed by reception component 1830 of apparatus 1802. The base station may receive the request to extend the timer or the request to terminate the timer prior to the expiration of the timer, based at least on multiple USIMs active at the UE. The base station may receive the request to extend the timer or the request to terminate the timer prior to the expiration of the timer from the UE. In some aspects, the request may be transmitted via L1 or L2 signaling.

Figure 16:
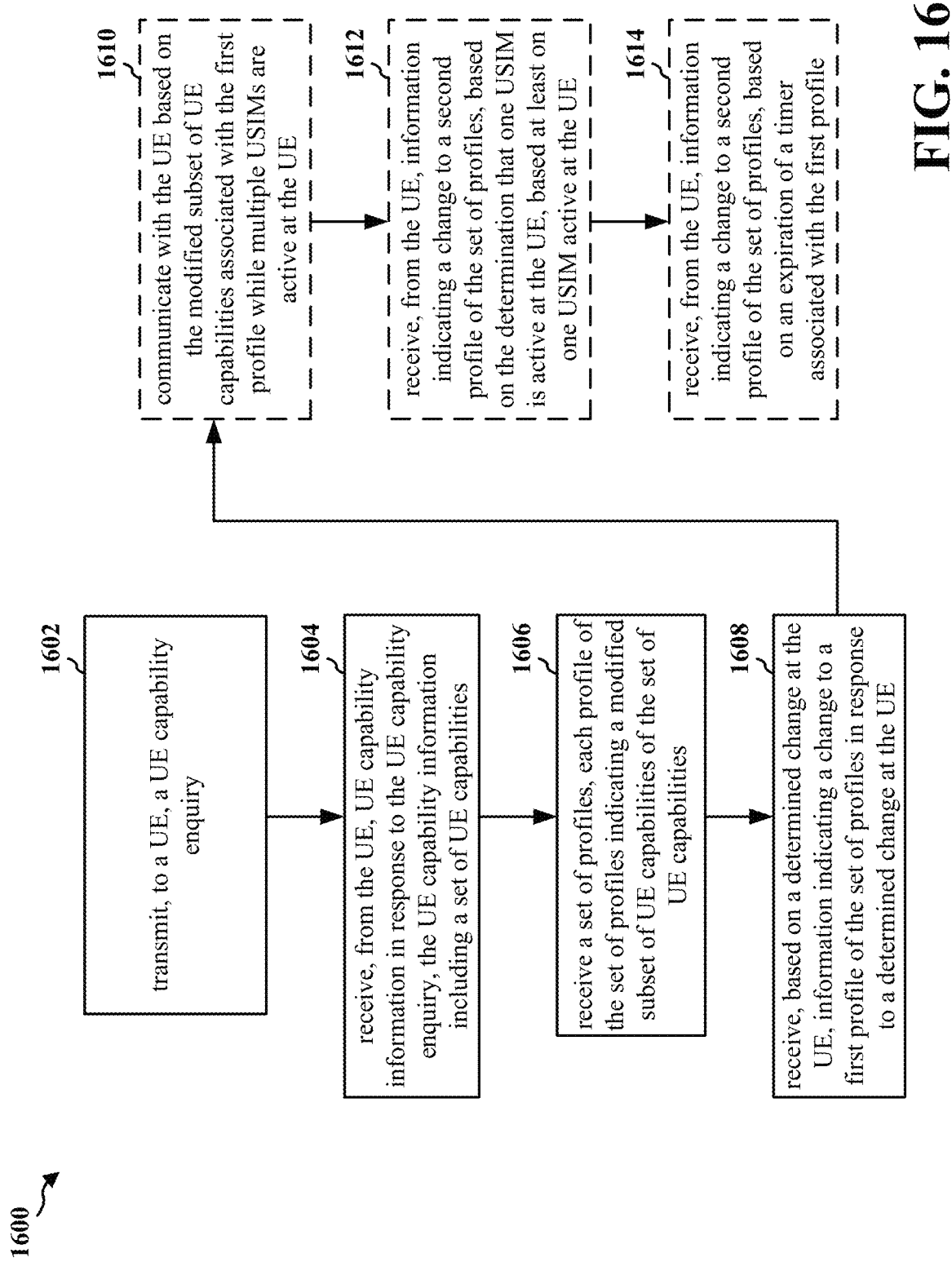
FIG. 16 is a flowchart of a method of wireless communication.

FIG. 16 is a flowchart 1600 of a method of wireless communication. The method may be performed by a base station or a component of a base station (e.g., the base station 102/180, 404, 406, 504, 604, 704, 804; the apparatus 1802; the baseband unit 1804, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to receive an indication to change profiles from a set of profiles, where each profile includes modified UE capabilities.

At 1602, the base station may transmit a UE capability enquiry. For example, 1602 may be performed by transmission component 1834 of apparatus 1802. The base station may transmit the UE capability enquiry to a UE.

At 1604, the base station may receive UE capability information. For example, 1604 may be performed by reception component 1830 of apparatus 1802. The base station may receive the UE capability information in response to the UE capability enquiry. The base station may receive the UE capability information from the UE. The UE capability information may include a set of UE capabilities.

At 1606, the base station may receive a set of profiles. For example, 1606 may be performed by reception component 1830 of apparatus 1802. Each profile of the set of profiles indicating a modified subset of UE capabilities of the set of UE capabilities.

At 1608, the base station may receive information indicating a change to a first profile of the set of profiles. For example, 1608 may be performed by reception component 1830 of apparatus 1802. The base station may receive the information indicating the change to a first profile of the set of profiles in response to a determined change at the UE. The base station may receive the information indicating the change to a first profile of the set of profiles in response to a determined change at the UE, based on a determined change at the UE. In some aspects, the determined change at the UE may comprise a determination that multiple USIMs are active at the UE.

In some aspects, for example at 1610, the base station may communicate with the UE based on the modified subset of UE capabilities. For example, 1610 may be performed by communication component 1840 of apparatus 1802. The base station may communicate with the UE based on the modified subset of UE capabilities associated with the first profile while multiple USIMs are active at the UE.

In some aspects, for example at 1612, the base station may receive information indicating a change to a second profile of the set of profiles. For example, 1612 may be performed by reception component 1830 of apparatus 1802. The base station may receive the information indicating the change to the second profile of the set of profiles, based on the determination that one USIM is active at the UE, based at least on one USIM active at the UE. The base station may receive the information indicating the change to the second profile from the UE. In some aspects, the information indicating the change to the second profile of the set of profiles may be transmitted via L1 or L2 signaling.

In some aspects, for example at 1614, the base station may receive information indicating a change to a second profile. For example, 1614 may be performed by reception component 1830 of apparatus 1802. The base station may receive the information indicating the change to a second profile, based on an expiration of a timer associated with the first profile. The base station may receive the information indicating the change to the second profile from the UE. In some aspects, the timer starts if the UE operates based on the modified subset of UE capabilities.

Figure 17:
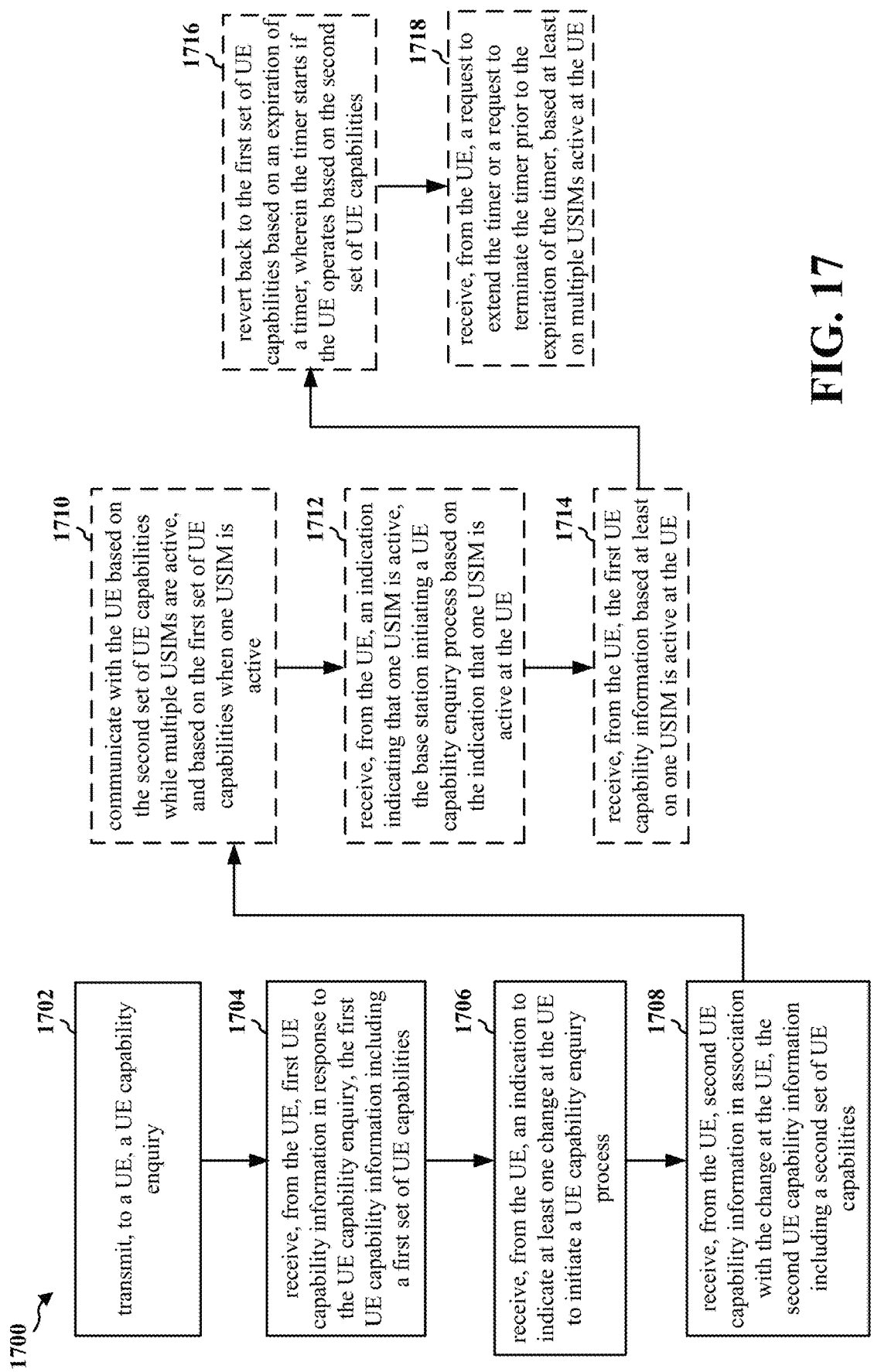
FIG. 17 is a flowchart of a method of wireless communication.

FIG. 17 is a flowchart 1700 of a method of wireless communication. The method may be performed by a base station or a component of a base station (e.g., the base station 102/180, 404, 406, 504, 604, 704, 804; the apparatus 1802; the baseband unit 1804, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to receive an indication of a change of UE capabilities when multiple USIMs are active at the UE.

At 1702, the base station may transmit a UE capability enquiry. For example, 1702 may be performed by transmission component 1834 of apparatus 1802. The base station may transmit the UE capability enquiry to a UE.

At 1704, the base station may receive first UE capability information. For example, 1704 may be performed by reception component 1830 of apparatus 1802. The base station may receive the first UE capability information in response to the UE capability enquiry. The base station may receive the first UE capability information from the UE. The first UE capability information may include a first set of UE capabilities.

At 1706, the base station may receive an indication to indicate at least one change at the UE to initiate a UE capability enquiry process. For example, 1706 may be performed by reception component 1830 of apparatus 1802. The base station may receive the indication indicating at least one change at the UE, such that the base station may initiate the UE capability enquiry process based at least on a change at the UE. The base station may receive the indication indicating the at least one change at the UE, from the UE, such that the base station may initiate the UE capability enquiry process in response to receiving the indication. In some aspects, the change at the UE may comprise multiple USIMs active at the UE.

At 1708, the base station may receive second UE capability information. For example, 1708 may be performed by reception component 1830 of apparatus 1802. The base station may receive the second UE capability information in association with the change at the UE. The base station may receive the second UE capability information from the UE. The second UE capability information may include a second set of UE capabilities.

In some aspects, for example at 1710, the base station may communicate with the UE based on the second set of UE capabilities. For example, 1710 may be performed by communication component 1840 of apparatus 1802. The base station may communicate with the UE based on the second set of UE capabilities while multiple USIMs are active. The base station may communicate with the UE based on the second set of UE capabilities while multiple USIMs are active, and based on the first set of UE capabilities when one USIM is active.

In some aspects, for example at 1712, the base station may receive an indication indicating that one USIM is active at the UE. The base station may initiate a UE capability enquiry process based on the indication that one USIM is active at the UE. For example, 1712 may be performed by reception component 1830 of apparatus 1802. The base station may initiate the UE capability enquiry process based on receiving the indication indicating that at least on one USIM being active at the UE. The base station may receive the indication from the UE.

In some aspects, for example at 1714, the base station may receive the first UE capability information. For example, 1714 may be performed by reception component 1830 of apparatus 1802. The base station may receive the first UE capability information based at least on one USIM is active at the UE. The base station may receive the first UE capability information from the UE.

In some aspects, for example at 1716, the base station may revert back to the first set of UE capabilities. For example, 1716 may be performed by revert component 1842 of apparatus 1802. The base station may revert back to the first set of UE capabilities based on an expiration of a timer. The timer may start if the UE operates based on the second set of UE capabilities.

In some aspects, for example at 1718, the base station may receive a request to extend the timer or a request to terminate the timer prior to the expiration of the timer. For example, 1718 may be performed by reception component 1830 of apparatus 1802. The base station may receive the request to extend the timer or the request to terminate the timer prior to the expiration of the timer, based at least on multiple USIMs active at the UE. The base station may receive the request to extend the timer or the request to terminate the timer prior to the expiration of the timer from the UE. In some aspects, the request may be transmitted via L1 or L2 signaling.

Figure 18:
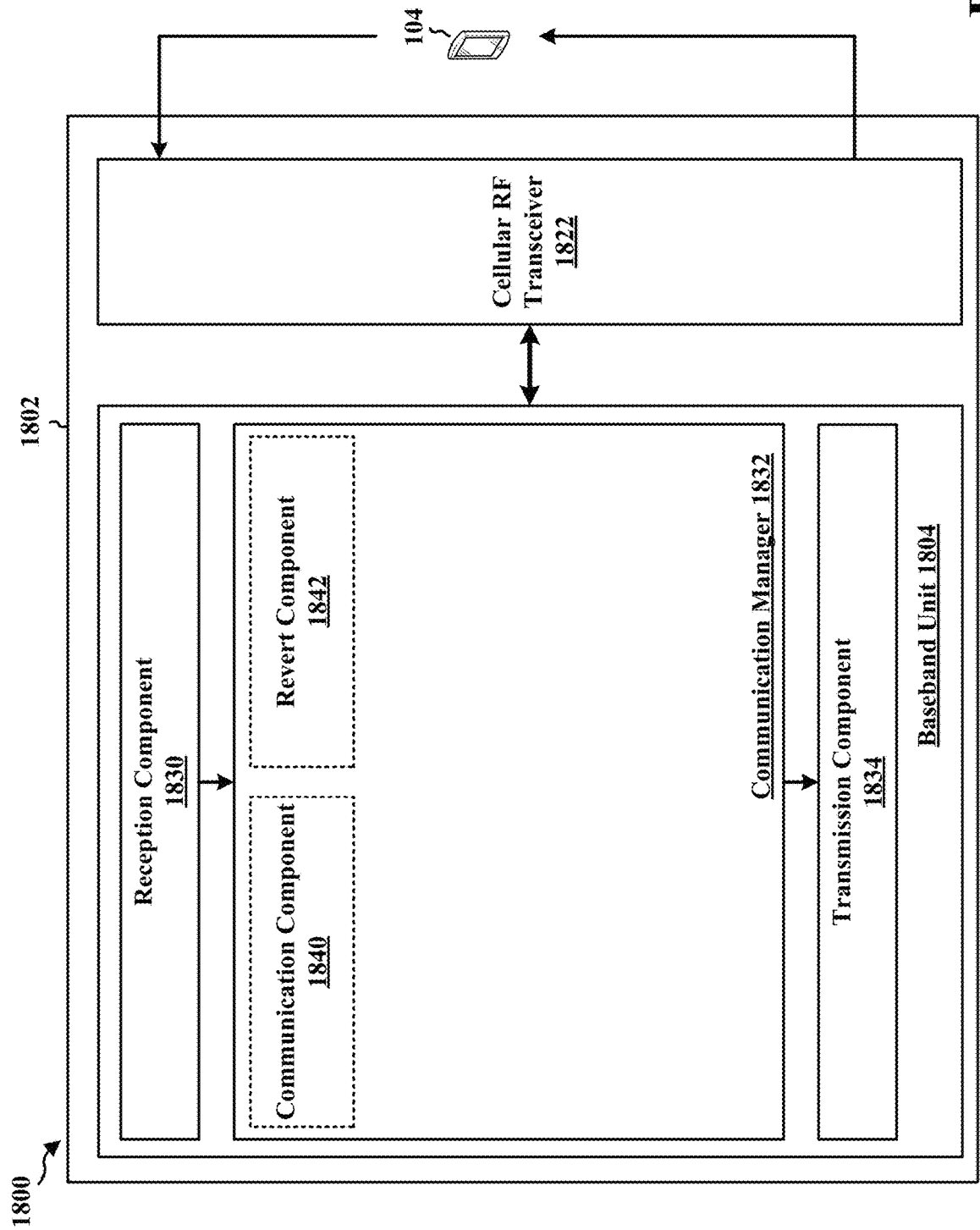
FIG. 18 is a diagram illustrating an example of a hardware implementation for an example apparatus.

FIG. 18 is a diagram 1800 illustrating an example of a hardware implementation for an apparatus 1802. The apparatus 1802 is a BS and includes a baseband unit 1804. The baseband unit 1804 may communicate through a cellular RF transceiver 1822 with the UE 104. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the BS 310 and may include the memory 376 and/or at least one of the TX processor 316, the RX processor 370, and the controller/processor 375.

The communication manager 1832 includes a communication component 1840 that may communicate with the UE based on the modified subset of UE capabilities, e.g., as described in connection with 1412 of FIG. 14. The communication component 1840 may be configured to communicate with the UE based on the changed subset of UE capabilities, e.g., as described in connection with 1508 of FIG. 15. The communication component 1840 may be configured to communicate with the UE based on the changed subset of UE capabilities, e.g., as described in connection with 1512 of FIG. 15. The communication component 1840 may be configured to communicate with the UE based on the modified subset of UE capabilities, e.g., as described in connection with 1610 of FIG. 16. The communication component 1840 may be configured to communicate with the UE based on the second set of UE capabilities, e.g., as described in connection with 1710 of FIG. 17. The communication manager 1832 further includes a revert component 1842 that may revert back to original UE capabilities for the subset of UE capabilities, e.g., as described in connection with 1416 of FIG. 14. The revert component 1842 may be configured to revert back to original UE capabilities, e.g., as described in connection with 1842 of FIG. 18. The revert component 1842 may be configured to may revert back to the first set of UE capabilities, e.g., as described in connection with 1716 of FIG. 17. The reception component 1830 may be configured to receive UE capability information, e.g., as described in connection with 1404 of FIG. 14. The reception component 1830 may be configured to receive UAI including an IE, e.g., as described in connection with 1406 of FIG. 14. The reception component 1830 may be configured to receive information indicating for the base station to revert back to original UE capabilities, e.g., as described in connection with 1414 of FIG. 14. The reception component 1830 may be configured to receive a request to extend the timer or a request to terminate the timer prior to the expiration of the timer, e.g., as described in connection with 1418 of FIG. 14. The reception component 1830 may be configured to receive UE capability information, e.g., as described in connection with 1504 of FIG. 15. The reception component 1830 may be configured to receive a capability change IE, e.g., as described in connection with 1506 of FIG. 15. The reception component 1830 may be configured to receive information indicating for the base station to revert back to original UE capabilities, e.g., as described in connection with 1510 of FIG. 15. The reception component 1830 may be configured to receive a request to extend the timer or a request to terminate the timer prior to the expiration of the timer, e.g., as described in connection with 1516 of FIG. 15. The reception component 1830 may be configured to receive UE capability information, e.g., as described in connection with 1604 of FIG. 16. The reception component 1830 may be configured to receive a set of profiles, e.g., as described in connection with 1606 of FIG. 16. The reception component 1830 may be configured to receive information indicating a change to a first profile of the set of profiles, e.g., as described in connection with 1608 of FIG. 16. The reception component 1830 may be configured to receive information indicating a change to a second profile of the set of profiles, e.g., as described in connection with 1612 of FIG. 16. The reception component 1830 may be configured to receive information indicating a change to a second profile, e.g., as described in connection with 1614 of FIG. 16. The reception component 1830 may be configured to receive first UE capability information, e.g., as described in connection with 1704 of FIG. 17. The reception component 1830 may be configured to receive an indication to indicate at least one change at the UE to initiate a UE capability enquiry process, e.g., as described in connection with 1706 of FIG. 17. The reception component 1830 may be configured to receive second UE capability information, e.g., as described in connection with 1708 of FIG. 17. The reception component 1830 may be configured to receive an indication indicating that one USIM is active at the UE, such that the base station initiates a UE capability enquiry process, e.g., as described in connection with 1712 of FIG. 17. The reception component 1830 may be configured to receive the first UE capability information, e.g., as described in connection with 1714 of FIG. 17. The reception component 1830 may be configured to receive a request to extend the timer or a request to terminate the timer prior to the expiration of the timer, e.g., as described in connection with 1718 of FIG. 17. The transmission component 1834 may be configured to transmit a UE capability enquiry, e.g., as described in connection with 1402 of FIG. 14. The transmission component 1834 may be configured to transmit alternative parameters for the subset of UE capabilities, e.g., as described in connection with 1408 of FIG. 14. The transmission component 1834 may be configured to transmit the alternative parameters to the UE, e.g., as described in connection with 1410 of FIG. 14. The transmission component 1834 may be configured to transmit a UE capability enquiry, e.g., as described in connection with 1502 of FIG. 15. The transmission component 1834 may be configured to transmit a UE capability enquiry, e.g., as described in connection with 1602 of FIG. 16. The transmission component 1834 may be configured to transmit a UE capability enquiry, e.g., as described in connection with 1702 of FIG. 17.

The apparatus may include additional components that perform each of the blocks of the algorithm in the aforementioned flowcharts of FIGS. 14-17. As such, each block in the aforementioned flowcharts of FIGS. 14-17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the baseband unit 1804, includes means for transmitting, to a UE, a UE capability enquiry. The apparatus includes means for receiving, from the UE, UE capability information in response to the UE capability enquiry. The UE capability information including a set of UE capabilities. The apparatus includes means for receiving, from the UE, UAI including an IE indicating a modified subset of UE capabilities of the set of UE capabilities when multiple USIMs are active at the UE. The apparatus includes means for communicating with the UE based on the modified subset of UE capabilities when multiple USIMs are active at the UE. The apparatus includes means for transmitting, to a UE, a UE capability enquiry. The apparatus includes means for receiving, from the UE, UE capability information in response to the UE capability enquiry. The UE capability information including a set of UE capabilities. The apparatus includes means for receiving, from the UE, a capability change IE indicating a subset of UE capabilities of the set of UE capabilities to change. The apparatus includes means for transmitting, to a UE, a UE capability enquiry. The apparatus includes means for receiving, from the UE, UE capability information in response to the UE capability enquiry. The UE capability information including a set of UE capabilities. The apparatus includes means for receiving a set of profiles, each profile of the set of profiles indicating a modified subset of UE capabilities of the set of UE capabilities. The apparatus includes means for receiving, based on a determined change at the UE, information indicating a change to a first profile of the set of profiles in response to a determined change at the UE. The apparatus includes means for transmitting, to a UE, a UE capability enquiry. The apparatus includes means for receiving, from the UE, first UE capability information in response to the UE capability enquiry. The first UE capability information including a first set of UE capabilities. The apparatus includes means for receiving, from the UE, an indication to initiate a UE capability enquiry process based at least one a change at the UE. The apparatus includes means for receiving, from the UE, second UE capability information in association with the change at the UE. The second UE capability information including a second set of UE capabilities. The apparatus further includes means for transmitting, to the UE, alternative parameters for the subset of UE capabilities in response to the transmitted UAI. The apparatus further includes means for transmitting, to the UE, an acknowledgment in response to the transmitted UAI. The apparatus further includes means for receiving, from the UE, information indicating for the base station to revert back to original UE capabilities for the subset of UE capabilities. The apparatus further includes means for reverting back to original UE capabilities for the subset of UE capabilities based on an expiration of a timer, wherein the timer starts if the UE operates based on the modified subset of UE capabilities. The apparatus further includes means for receiving, from the UE, a request to extend the timer or a request to terminate the timer prior to the expiration of the timer, based at least on multiple USIMs active at the UE. The apparatus further includes means for communicating with the UE based on the changed subset of UE capabilities when multiple USIMs are active at the UE. The apparatus further includes means for receiving, from the UE, information indicating for the base station to revert back to original UE capabilities for the subset of UE capabilities, based at least on one USIM is active at the UE. The apparatus further includes means for communicating with the UE based on the changed subset of UE capabilities when multiple USIMs are active at the UE. The apparatus further includes means for reverting back to original UE capabilities for the subset of UE capabilities based on expiration of a timer. The apparatus further includes means for receiving, from the UE, a request to extend the timer or a request to terminate the timer prior to the expiration of the timer, based at least on multiple USIMs active at the UE. The apparatus further includes means for communicating with the UE based on the modified subset of UE capabilities associated with the first profile while multiple USIMs are active at the UE. The apparatus further includes means for receiving, from the UE, information indicating a change to a second profile of the set of profiles, based on the determination that one USIM is active at the UE, based at least on one USIM active at the UE. The apparatus further includes means for receiving, from the UE, information indicating a change to a second profile of the set of profiles, based on an expiration of a timer associated with the first profile. The apparatus further includes means for communicating with the UE based on the second set of UE capabilities while multiple USIMs are active, and based on the first set of UE capabilities when one USIM is active. The apparatus further includes means for receiving, from the UE, a request to initiate a UE capability enquiry process based at least on one USIM is active at the UE. The apparatus further includes means for receiving, from the UE, the first UE capability information based at least on one USIM is active at the UE. The apparatus further includes means for reverting back to the first set of UE capabilities based on an expiration of a timer, wherein the timer starts if the UE operates based on the second set of UE capabilities. The apparatus further includes means for receiving, from the UE, a request to extend the timer or a request to terminate the timer prior to the expiration of the timer, based at least on multiple USIMs active at the UE. The aforementioned means may be one or more of the aforementioned components of the apparatus 1802 configured to perform the functions recited by the aforementioned means. As described supra, the apparatus 1802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication of a UE comprising transmitting, to a base station, UE capability information in response to a UE capability enquiry, the UE capability information including a set of UE capabilities; transmitting, to the base station, UAI including an IE indicating a modified subset of UE capabilities of the set of UE capabilities when multiple USIMs are active at the UE; and operating based on the modified subset of UE capabilities when multiple USIMs are active at the UE.

In Aspect 2, the method of Aspect 1 further includes determining that multiple USIMs are active at the UE, wherein the UAI is transmitted upon determining that the multiple USIMs are active at the UE.

In Aspect 3, the method of Aspect 1 or 2 further includes determining that multiple USIMs are active at the UE, wherein the UAI is transmitted before determining that the multiple USIMs are active at the UE.

In Aspect 4, the method of any of Aspects 1-3 further includes receiving, from the base station, alternative parameters for the subset of UE capabilities in response to the transmitted UAI.

In Aspect 5, the method of any of Aspects 1-4 further includes receiving an acknowledgment from the base station in response to the transmitted UAI.

In Aspect 6, the method of any of Aspects 1-5 further includes that the modified subset of UE capabilities comprise reduced UE capabilities.

In Aspect 7, the method of any of Aspects 1-6 further includes determining that one USIM is active; and transmitting, based on the determination that one USIM is active, information to the base station indicating for the base station to revert back to original UE capabilities for the subset of UE capabilities.

In Aspect 8, the method of any of Aspects 1-7 further includes reverting back to original UE capabilities for the subset of UE capabilities based on an expiration of a timer, wherein the timer starts if the UE operates based on the modified subset of UE capabilities.

In Aspect 9, the method of any of Aspects 1-8 further includes transmitting a request to extend the timer or a request to terminate the timer prior to the expiration of the timer, based at least on multiple USIMs active at the UE.

In Aspect 10, the method of any of Aspects 1-9 further includes that the request is transmitted via Layer-1 (L1) or Layer-2 (L2) signaling.

Aspect 11 is a device including one or more processors and one or more memories in electronic communication with the one or more processors storing instructions executable by the one or more processors to cause the system or apparatus to implement a method as in any of Aspects 1-10.

Aspect 12 is a system or apparatus including means for implementing a method or realizing an apparatus as in any of Aspects 1-10.

Aspect 13 is a non-transitory computer readable medium storing instructions executable by one or more processors to cause the one or more processors to implement a method as in any of Aspects 1-10.

Aspect 14 is a method of wireless communication of a UE comprising transmitting, to a base station, UE capability information in response to a UE capability enquiry, the UE capability information including a set of UE capabilities; and transmitting a capability change IE indicating a subset of UE capabilities of the set of UE capabilities to change.

In Aspect 15, the method of Aspect 14 further includes that the capability change IE is transmitted through one of RRC signaling or UAI.

In Aspect 16, the method of Aspect 14 or 15 further includes determining that multiple USIMs are active, wherein the capability change IE is transmitted in response to determining that multiple USIMs are active.

In Aspect 17, the method of any of Aspects 14-16 further includes operating based on the changed subset of UE capabilities when multiple USIMs are active at the UE; determining subsequently that one USIM is active; and transmitting, based on the determination that one USIM is active, information to the base station indicating for the base station to revert back to original UE capabilities for the subset of UE capabilities.

In Aspect 18, the method of any of Aspects 14-17 further includes operating based on the changed subset of UE capabilities when multiple USIMs are active at the UE; and reverting back to original UE capabilities for the subset of UE capabilities based on expiration of a timer.

In Aspect 19, the method of any of Aspects 14-18 further includes transmitting a request to extend the timer or a request to terminate the timer prior to the expiration of the timer, based at least on multiple USIMs active at the UE.

In Aspect 20, the method of any of Aspects 14-19 further includes that the request is transmitted via L1 or L2 signaling.

In Aspect 21, the method of any of Aspects 14-20 further includes that the timer starts if the UE operates based on the changed subset of UE capabilities.

Aspect 22 is a device including one or more processors and one or more memories in electronic communication with the one or more processors storing instructions executable by the one or more processors to cause the system or apparatus to implement a method as in any of Aspects 14-21.

Aspect 23 is a system or apparatus including means for implementing a method or realizing an apparatus as in any of Aspects 14-21.

Aspect 24 is a non-transitory computer readable medium storing instructions executable by one or more processors to cause the one or more processors to implement a method as in any of Aspects 14-21.

Aspect 25 is a method of wireless communication of a UE comprising transmitting, to a base station, UE capability information in response to a UE capability enquiry, the UE capability information including a set of UE capabilities; transmitting a set of profiles, each profile of the set of profiles indicating a modified subset of UE capabilities of the set of UE capabilities; determining a change at the UE; and transmitting, based on the determined change at the UE, information to the base station indicating a change to a first profile of the set of profiles in response to the determined change at the UE.

In Aspect 26, the method of Aspect 25 further includes that the determining the change at the UE comprises determining that multiple USIMs are active at the UE.

In Aspect 27, the method of Aspect 25 or 26 further includes operating based on the modified subset of UE capabilities associated with the first profile while multiple USIMs are active.

In Aspect 28, the method of any of Aspects 25-27 further includes determining that one USIM is active at the UE; and transmitting, based on the determination that one USIM is active at the UE, information to the base station indicating a change to a second profile of the set of profiles.

In Aspect 29, the method of any of Aspects 25-28 further includes that the information to the base station indicating the change to the second profile of the set of profiles is transmitted via L1 or L2 signaling.

In Aspect 30, the method of any of Aspects 25-29 further includes determining that a timer expired in association with the first profile; and transmitting, based on the determination that timer expired in association with the first profile, information to the base station indicating a change to a second profile of the set of profiles.

In Aspect 31, the method of any of Aspects 25-30 further includes that the timer starts if the UE operates based on the modified subset of UE capabilities.

Aspect 32 is a device including one or more processors and one or more memories in electronic communication with the one or more processors storing instructions executable by the one or more processors to cause the system or apparatus to implement a method as in any of Aspects 25-31.

Aspect 33 is a system or apparatus including means for implementing a method or realizing an apparatus as in any of Aspects 25-31.

Aspect 34 is a non-transitory computer readable medium storing instructions executable by one or more processors to cause the one or more processors to implement a method as in any of Aspects 25-31.

Aspect 35 is a method of wireless communication of a UE comprising transmitting, to a base station, first UE capability information in response to a UE capability enquiry, the first UE capability information including a first set of UE capabilities; determining a change at the UE; transmitting, to the base station, an indication to indicate the change at the UE to initiate a UE capability enquiry process; and transmitting, to the base station, second UE capability information in association with the determined change at the UE, the second UE capability information including a second set of UE capabilities.

In Aspect 36, the method of Aspect 35 further includes that the determining the change at the UE comprises determining that multiple USIMs are active at the UE.

In Aspect 37, the method of Aspect 35 or 36 further includes operating based on the second set of UE capabilities while multiple USIMs are active, and based on the first set of UE capabilities when one USIM is active.

In Aspect 38, the method of any of Aspects 35-37 further includes determining that one USIM is active at the UE; transmitting, to the base station, an indication that one USIM is active to initiate a UE capability enquiry process; and transmitting, based on the determination that one USIM is active at the UE, the first UE capability information.

In Aspect 39, the method of any of Aspects 35-38 further includes that the UE performs a RACH procedure to confirm a capability change between the first and second sets of UE capabilities.

In Aspect 40, the method of any of Aspects 35-39 further includes the UE resets at least one of MAC, RLC, or PDCP in response to a capability change between the first and second sets of UE capabilities.

In Aspect 41, the method of any of Aspects 35-40 further includes that at least one of the MAC, RLC, or PDCP is reset in response to the capability change between the first and second set of UE capabilities if the capability change impacts operation of at least one of the MAC, RLC, or PDCP.

In Aspect 42, the method of any of Aspects 35-41 further includes reverting back to the first set of UE capabilities based on an expiration of a timer, wherein the timer starts if the UE operates based on the second set of UE capabilities.

In Aspect 43, the method of any of Aspects 35-42 further includes transmitting a request to extend the timer or a request to terminate the timer prior to the expiration of the timer, based at least on multiple USIMs active at the UE.

In Aspect 44, the method of any of Aspects 35-43 further includes that the request is transmitted via L1 or L2 signaling.

Aspect 45 is a device including one or more processors and one or more memories in electronic communication with the one or more processors storing instructions executable by the one or more processors to cause the system or apparatus to implement a method as in any of Aspects 35-44.

Aspect 46 is a system or apparatus including means for implementing a method or realizing an apparatus as in any of Aspects 35-44.

Aspect 47 is a non-transitory computer readable medium storing instructions executable by one or more processors to cause the one or more processors to implement a method as in any of Aspects 35-44.

Aspect 48 is a method of wireless communication of a base station comprising transmitting, to a UE, a UE capability enquiry; receiving, from the UE, UE capability information in response to the UE capability enquiry, the UE capability information including a set of UE capabilities; receiving, from the UE, UAI including an IE indicating a modified subset of UE capabilities of the set of UE capabilities when multiple USIMs are active at the UE; and communicating with the UE based on the modified subset of UE capabilities when multiple USIMs are active at the UE.

In Aspect 49, the method of Aspect 48 further includes transmitting, to the UE, alternative parameters for the subset of UE capabilities in response to the transmitted UAI.

In Aspect 50, the method of Aspect 48 or 49 further includes transmitting, to the UE, an acknowledgment in response to the transmitted UAI.

In Aspect 51, the method of any of Aspects 48-50 further includes that the modified subset of UE capabilities comprise reduced UE capabilities.

In Aspect 52, the method of any of Aspects 48-51 further includes receiving, from the UE, information indicating for the base station to revert back to original UE capabilities for the subset of UE capabilities.

In Aspect 53, the method of any of Aspects 48-52 further includes reverting back to original UE capabilities for the subset of UE capabilities based on an expiration of a timer, wherein the timer starts if the UE operates based on the modified subset of UE capabilities.

In Aspect 54, the method of any of Aspects 48-53 further includes receiving, from the UE, a request to extend the timer or a request to terminate the timer prior to the expiration of the timer, based at least on multiple USIMs active at the UE.

In Aspect 55, the method of any of Aspects 48-54 further includes that the request is transmitted via L1 or L2 signaling.

Aspect 56 is a device including one or more processors and one or more memories in electronic communication with the one or more processors storing instructions executable by the one or more processors to cause the system or apparatus to implement a method as in any of Aspects 48-55.

Aspect 57 is a system or apparatus including means for implementing a method or realizing an apparatus as in any of Aspects 48-55.

Aspect 58 is a non-transitory computer readable medium storing instructions executable by one or more processors to cause the one or more processors to implement a method as in any of Aspects 48-55.

Aspect 59 is a method of wireless communication of a base station comprising transmitting, to a UE, a UE capability enquiry; receiving, from the UE, UE capability information in response to the UE capability enquiry, the UE capability information including a set of UE capabilities; and receiving, from the UE, a capability change IE indicating a subset of UE capabilities of the set of UE capabilities to change.

In Aspect 60, the method of Aspect 59 further includes that the capability change IE is transmitted through one of RRC signaling or UAI.

In Aspect 61, the method of Aspect 59 or 60 further includes communicating with the UE based on the changed subset of UE capabilities when multiple USIMs are active at the UE; and receiving, from the UE, information indicating for the base station to revert back to original UE capabilities for the subset of UE capabilities, based at least on one USIM is active at the UE.

In Aspect 62, the method of any of Aspects 59-61 further includes communicating with the UE based on the changed subset of UE capabilities when multiple USIMs are active at the UE; and reverting back to original UE capabilities for the subset of UE capabilities based on expiration of a timer.

In Aspect 63, the method of any of Aspects 59-62 further includes receiving, from the UE, a request to extend the timer or a request to terminate the timer prior to the expiration of the timer, based at least on multiple USIMs active at the UE.

In Aspect 64, the method of any of Aspects 59-63 further includes that the request is transmitted via L1 or L2 signaling.

In Aspect 65, the method of any of Aspects 59-64 further includes that the timer starts if the UE operates based on the changed subset of UE capabilities.

Aspect 66 is a device including one or more processors and one or more memories in electronic communication with the one or more processors storing instructions executable by the one or more processors to cause the system or apparatus to implement a method as in any of Aspects 59-65.

Aspect 67 is a system or apparatus including means for implementing a method or realizing an apparatus as in any of Aspects 59-65.

Aspect 68 is a non-transitory computer readable medium storing instructions executable by one or more processors to cause the one or more processors to implement a method as in any of Aspects 59-65.

Aspect 69 is a method of wireless communication of a base station comprising transmitting, to a UE, a UE capability enquiry; receiving, from the UE, UE capability information in response to the UE capability enquiry, the UE capability information including a set of UE capabilities; receiving a set of profiles, each profile of the set of profiles indicating a modified subset of UE capabilities of the set of UE capabilities; and receiving, based on a determined change at the UE, information indicating a change to a first profile of the set of profiles in response to a determined change at the UE.

In Aspect 70, the method of Aspect 69 further includes that the determined change at the UE comprises a determination that multiple USIMs are active at the UE.

In Aspect 71, the method of Aspect 69 or 70 further includes communicating with the UE based on the modified subset of UE capabilities associated with the first profile while multiple USIMs are active at the UE.

In Aspect 72, the method of any of Aspects 69-71 further includes receiving, from the UE, information indicating a change to a second profile of the set of profiles, based on the determination that one USIM is active at the UE, based at least on one USIM active at the UE.

In Aspect 73, the method of any of Aspects 69-72 further includes that the information indicating the change to the second profile of the set of profiles is transmitted via L1 or L2 signaling.

In Aspect 74, the method of any of Aspects 69-73 further includes receiving, from the UE, information indicating a change to a second profile of the set of profiles, based on an expiration of a timer associated with the first profile.

In Aspect 75, the method of any of Aspects 69-74 further includes that the timer starts if the UE operates based on the modified subset of UE capabilities.

Aspect 76 is a device including one or more processors and one or more memories in electronic communication with the one or more processors storing instructions executable by the one or more processors to cause the system or apparatus to implement a method as in any of Aspects 69-75.

Aspect 77 is a system or apparatus including means for implementing a method or realizing an apparatus as in any of Aspects 69-75.

Aspect 78 is a non-transitory computer readable medium storing instructions executable by one or more processors to cause the one or more processors to implement a method as in any of Aspects 69-75.

Aspect 79 is a method of wireless communication of a base station comprising transmitting, to a UE, a UE capability enquiry; receiving, from the UE, first UE capability information in response to the UE capability enquiry, the first UE capability information including a first set of UE capabilities; receiving, from the UE, an indication to indicate at least one change at the UE to initiate a UE capability enquiry process; and receiving, from the UE, second UE capability information in association with the change at the UE, the second UE capability information including a second set of UE capabilities.

In Aspect 80, the method of Aspect 79 further includes that the at least one change at the UE comprises that multiple USIMs are active at the UE.

In Aspect 81, the method of Aspect 79 or 80 further includes communicating with the UE based on the second set of UE capabilities while multiple USIMs are active, and based on the first set of UE capabilities when one USIM is active.

In Aspect 82, the method of any of Aspects 79-81 further includes receiving, from the UE, an indication indicating that one USIM is active, wherein the base station initiate s a UE capability enquiry process based on the indication that one USIM is active at the UE; and receiving, from the UE, the first UE capability information based at least on one USIM is active at the UE.

In Aspect 83, the method of any of Aspects 79-82 further includes reverting back to the first set of UE capabilities based on an expiration of a timer, wherein the timer starts if the UE operates based on the second set of UE capabilities.

In Aspect 84, the method of any of Aspects 79-83 further includes receiving, from the UE, a request to extend the timer or a request to terminate the timer prior to the expiration of the timer, based at least on multiple USIMs active at the UE.

In Aspect 85, the method of any of Aspects 79-84 further includes that the request is transmitted via L1 or L2 signaling.

Aspect 86 is a device including one or more processors and one or more memories in electronic communication with the one or more processors storing instructions executable by the one or more processors to cause the system or apparatus to implement a method as in any of Aspects 79-85.

Aspect 87 is a system or apparatus including means for implementing a method or realizing an apparatus as in any of Aspects 79-85.

Aspect 88 is a non-transitory computer readable medium storing instructions executable by one or more processors to cause the one or more processors to implement a method as in any of Aspects 79-85.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   transmitting, to a base station, UE capability information in response to a UE capability enquiry, the UE capability information including a set of UE capabilities;
   transmitting, to the base station, UE assistance information (UAI) including an information element (IE) indicating a modified subset of UE capabilities of the set of UE capabilities when multiple universal subscriber identity modules (USIMs) are active at the UE; and
   operating based on the modified subset of UE capabilities when multiple USIMs are active at the UE.

2. The method of claim 1, further comprising:
   determining that the multiple USIMs are active at the UE, wherein the UAI is transmitted upon determining that the multiple USIMs are active at the UE.

3. The method of claim 1, further comprising:
   determining that the multiple USIMs are active at the UE, wherein the UAI is transmitted before determining that the multiple USIMs are active at the UE.

4. The method of claim 1, further comprising:
   receiving, from the base station, alternative parameters for the subset of UE capabilities in response to the transmitted UAI.

5. The method of claim 1, further comprising:
   receiving an acknowledgment from the base station in response to the transmitted UAI.

6. The method of claim 1, wherein the modified subset of UE capabilities comprise reduced UE capabilities.

7. The method of claim 1, further comprising:
   determining that one USIM is active; and
   transmitting, based on the determination that one USIM is active, information to the base station indicating for the base station to revert back to original UE capabilities for the subset of UE capabilities.

8. The method of claim 1, further comprising:
   reverting back to original UE capabilities for the subset of UE capabilities based on an expiration of a timer, wherein the timer starts if the UE operates based on the modified subset of UE capabilities.

9. The method of claim 8, further comprising:
   transmitting a request to extend the timer or a request to terminate the timer prior to the expiration of the timer, based at least on the multiple USIMs active at the UE, wherein the request is transmitted via Layer-1 (L1) or Layer-2 (L2) signaling.

10. An apparatus for wireless communication at a user equipment (UE), comprising:
    a memory; and
    at least one processor coupled to the memory and configured to:
      transmit, to a base station, UE capability information in response to a UE capability enquiry, the UE capability information including a set of UE capabilities;
      transmit, to the base station, UE assistance information (UAI) including an information element (IE) indicating a modified subset of UE capabilities of the set of UE capabilities when multiple universal subscriber identity modules (USIMs) are active at the UE; and
      operate based on the modified subset of UE capabilities when multiple USIMs are active at the UE.

11. The apparatus of claim 10, wherein the at least one processor further configured to:
    determine that the multiple USIMs are active at the UE, wherein the UAI is transmitted upon determining that the multiple USIMs are active at the UE.

12. The apparatus of claim 10, wherein the at least one processor further configured to:
    determine that the multiple USIMs are active at the UE, wherein the UAI is transmitted before determining that the multiple USIMs are active at the UE.

13. The apparatus of claim 10, wherein the at least one processor further configured to:
    receive, from the base station, alternative parameters for the subset of UE capabilities in response to the transmitted UAI.

14. The apparatus of claim 10, wherein the at least one processor further configured to:
    receive an acknowledgment from the base station in response to the transmitted UAI.

15. The apparatus of claim 10, wherein the modified subset of UE capabilities comprise reduced UE capabilities.

16. The apparatus of claim 10, wherein the at least one processor further configured to:
    determine that one USIM is active; and transmit, based on the determination that one USIM is active, information to the base station indicating for the base station to revert back to original UE capabilities for the subset of UE capabilities.

17. The apparatus of claim 10, wherein the at least one processor further configured to:
revert back to original UE capabilities for the subset of UE capabilities based on an expiration of a timer, wherein the timer starts if the UE operates based on the modified subset of UE capabilities.

18. The apparatus of claim 17, wherein the at least one processor further configured to:
transmit a request to extend the timer or a request to terminate the timer prior to the expiration of the timer, based at least on the multiple USIMs active at the UE, wherein the request is transmitted via Layer-1 (L1) or Layer-2 (L2) signaling.

19. A method of wireless communication of a user equipment (UE), comprising:
transmitting, to a base station, UE capability information in response to a UE capability enquiry, the UE capability information including a set of UE capabilities; and
transmitting a capability change information element (IE) indicating a subset of UE capabilities of the set of UE capabilities to change in response to multiple universal subscriber identity modules (USIMs) active at the UE.

20. The method of claim 19, wherein the capability change IE is transmitted through one of radio resource control (RRC) signaling or UE assistance information (UAI).

21. The method of claim 19, further comprising:
determining that the multiple USIMs are active, wherein the capability change IE is transmitted in response to determining that the multiple USIMs are active.

22. The method of claim 19, further comprising:
operating based on the changed subset of UE capabilities when the multiple USIMs are active at the UE;
determining subsequently that one USIM is active; and
transmitting, based on the determination that the one USIM is active, information to the base station indicating for the base station to revert back to original UE capabilities for the subset of UE capabilities.

23. The method of claim 19, further comprising:
operating based on the changed subset of UE capabilities when the multiple USIMs are active at the UE; and
reverting back to original UE capabilities for the subset of UE capabilities based on expiration of a timer.

24. The method of claim 23, further comprising:
transmitting a request to extend the timer or a request to terminate the timer prior to the expiration of the timer, based at least on the multiple USIMs active at the UE, wherein the request is transmitted via Layer-1 (L1) or Layer-2 (L2) signaling, wherein the timer starts if the UE operates based on the changed subset of UE capabilities.

25. An apparatus for wireless communication at a user equipment (UE), comprising:
a memory; and
at least one processor coupled to the memory and configured to:
transmit, to a base station, UE capability information in response to a UE capability enquiry, the UE capability information including a set of UE capabilities; and
transmit a capability change information element (IE) indicating a subset of UE capabilities of the set of UE capabilities to change in response to multiple universal subscriber identity modules (USIMs) active at the UE.

26. The apparatus of claim 25, wherein the capability change IE is transmitted through one of radio resource control (RRC) signaling or UE assistance information (UAI).

27. The apparatus of claim 25, wherein the at least one processor further configured to:
determine that the multiple USIMs are active, wherein the capability change IE is transmitted in response to determining that the multiple USIMs are active.

28. The apparatus of claim 25, wherein the at least one processor further configured to:
operate based on the changed subset of UE capabilities when the multiple USIMs are active at the UE;
determine subsequently that one USIM is active; and
transmit, based on the determination that the one USIM is active, information to the base station indicating for the base station to revert back to original UE capabilities for the subset of UE capabilities.

29. The apparatus of claim 25, wherein the at least one processor further configured to:
operate based on the changed subset of UE capabilities when the multiple USIMs are active at the UE; and
revert back to original UE capabilities for the subset of UE capabilities based on expiration of a timer.

30. The apparatus of claim 29, wherein the at least one processor further configured to:
transmit a request to extend the timer or a request to terminate the timer prior to the expiration of the timer, based at least on the multiple USIMs active at the UE, wherein the request is transmitted via Layer-1 (L1) or Layer-2 (L2) signaling, wherein the timer starts if the UE operates based on the changed subset of UE capabilities.

* * * * *